(12) United States Patent
Sunkara et al.

(10) Patent No.: US 10,030,201 B1
(45) Date of Patent: Jul. 24, 2018

(54) CATALYST COMPOSITION AND METHODS FOR DESULFURIZATION

(71) Applicants: Mahendra Sunkara, Louisville, KY (US); Franz Petzold, Louisville, KY (US); Mayank Gupta, Louisville, KY (US); Dania Alvarez Fonseca, Louisville, KY (US)

(72) Inventors: Mahendra Sunkara, Louisville, KY (US); Franz Petzold, Louisville, KY (US); Mayank Gupta, Louisville, KY (US); Dania Alvarez Fonseca, Louisville, KY (US)

(73) Assignee: University of Louisville Research Foundation, Louisville, KY (US)

( * ) Notice: Subject to any disclaimer, the term of this patent is extended or adjusted under 35 U.S.C. 154(b) by 601 days.

(21) Appl. No.: 13/942,633

(22) Filed: Jul. 15, 2013

Related U.S. Application Data

(60) Provisional application No. 61/671,384, filed on Jul. 13, 2012.

(51) Int. Cl.
*C10G 25/02* (2006.01)
*B01J 23/887* (2006.01)
*B01J 23/80* (2006.01)

(52) U.S. Cl.
CPC .............. *C10G 25/02* (2013.01); *B01J 23/80* (2013.01); *B01J 23/8873* (2013.01)

(58) Field of Classification Search
CPC .......... B01J 23/06; B01J 23/80; B01J 23/887; C01G 25/02
USPC ........................................................ 502/343
See application file for complete search history.

(56) References Cited

PUBLICATIONS

Petzold et al. ("Nickel supported on zinc oxide nanowires as advanced hydrodesulfurization catalysts," Catalysis Today 198, pp. 219-227, Jul. 2012).*
Zou et al. ("Control of the Metal—Support Interface of NiO-Loaded Photocatalysts via Cold Plasma Treatment," Langmuir 22(6), pp. 2334-2339, Feb. 2006).*
Da Costa-Serra et al. ("Co/ZnO and Ni/ZnO catalysts for hydrogen production by bioethanol steam reforming. Influence of ZnO support morphology on the catalytic properties of Co and Ni active phases," International Journal of Hydrogen Energy 35, pp. 6709-6716, May 2010; hereinafter referred to as DCS).*
Kumar et al. ("Gas-Phase, Bulk Production of Metal Oxide Nanowires and Nanoparticles Using a Microwave Plasma Jet Reactor," Journal of Physical Chemistry C 112(46), pp. 17750-17754, Oct. 2008).*
S.A. Ali, S. Ahmed, Fuel Processing Technology 98 (2012) 39-44.
I. Bezverkhyy, A. Ryzhikov, G. Gadacz, J.P. Bellat. Catal. Today 130 (2008), 199-205.

(Continued)

*Primary Examiner* — Melvin C. Mayes
*Assistant Examiner* — Michael Forrest
(74) *Attorney, Agent, or Firm* — Law Office of J. L. Simunic; Joan L. Simunic

(57) ABSTRACT

The present development is a catalyst composition, comprising zinc oxide nanowires having one or more catalytically-active metal particles attached to a surface of the zinc oxide nanowires. The catalytically-active metal particles are comprised of a metal selected from the group consisting of nickel, cobalt, molybdenum, tungsten, copper, and platinum. The present development further discloses a method to prepare the catalyst composition, and use of the catalyst composition for desulfurization.

15 Claims, 15 Drawing Sheets

(56) References Cited

PUBLICATIONS

P. Biswas, D. Kunzru, International Journal of Hydrogen Energy 32 (2007) 969-980.
A. Chica, S. Sayas, Catal. Today 146 (2009) 37-43.
J. Costa-Serra, R. Guil-Lopez, A. Chica, Int. J. Of Hydrogen Energy 35 (2010) 6709-6716.
H. Farag, I. Mochida, J. Colloid and Interface Sci. 372 (2012) 121-129.
V. Fierro, O. Akdim, H. Provendier, C. Mirodatos, Journal of Power Sources 145 (2005) 659-666.
T. Fujikawa, H. Kimura, Catal. Today 111 (2006) 188-193.
Q. Gao, T. Ofosu, Catal. Today 164 (2011) 538-543.
A. Gutsch, M. Kramer, G. Michael, H. Muhlenweg, M. Pridohl, G. Zimmerman, Kona 20 (2002) 24-37.
A. Haryanto, S. Fernando, N. Murali, S. Adhikari, Energy & Fuels 19 (2005) 2098-2106.
L. Huang, G. Wang, Z. Qin, M. Dong, M. Du, H. Ge, X. Li, Y.Zhao, J. Zhang, T. Hu, J. Wang, Appl. Catal. B. 106 (2011) 26-38.
E. Ito, J.R.V. Veen, Catal. Today 116 (2006) 446-460.
V. Kumar, J.H. Kim, C. Pendyala, B. Chernomordik, M.K. Sunkara, J. Phys. Chem. C 112 (2008) 17750-17754.
Y.J. Lee, N.-K. Park, G.B. Han, S.O. Ryu, T.J. Lee, C.H. Chang, Cuff. Appl. Phys. 8 (2008) 746-751.
B. Liu, H.C. Zeng, J. Am. Chem. Soc. 12 (2003), 4430-4431.
J. Llorca, N. Homs, J. Sales, P.R. De La Piscina. Journal of Catalysis 209 (2002), 306-317.
A.M. Morales, C.M. Lieber, Science 279 (1998) 208-211.
H. Muroyama, R. Nakase, T. Matsui, K. Eguchi, Int. J.of Hydrogen Energy 35 (2010) 1575-1581.
A. Ryzhikov, I. Bezverkhyy, J. Bellat, Appl. Catal. B 35 (2008) 6709-6716.
B. Sharma, M.K. Sunkara, J. Am. Chem. Soc. 124 (2002) 12288-12293.
C. Song, Catal. Today 86 (2003) 211-263.
K. Tawara, J. Imai, H. Iwanami, Sekiyu Gakkaishi-J. Japan Petroleum Institute 43 (2000) 105-113.
K. Tawara, T. Nishimura, I. Iwanami, Sekiyu Gakkaishi-J. Japan Petroleum Institute 43 (2000), 114-120.
M.P. Zach, K.H. NG, R.M. Penner, Science 290 (2000) 2120-2123.
J. Zhang, Y. Liu, S. Tian, Y. Chai, C. Liu, J. Nat. Gas Chem. 19 (2010), 327-332.
Y. Zhang, Y. Yang, Appl. Catal. B, 119 (2012) 13-19.

\* cited by examiner

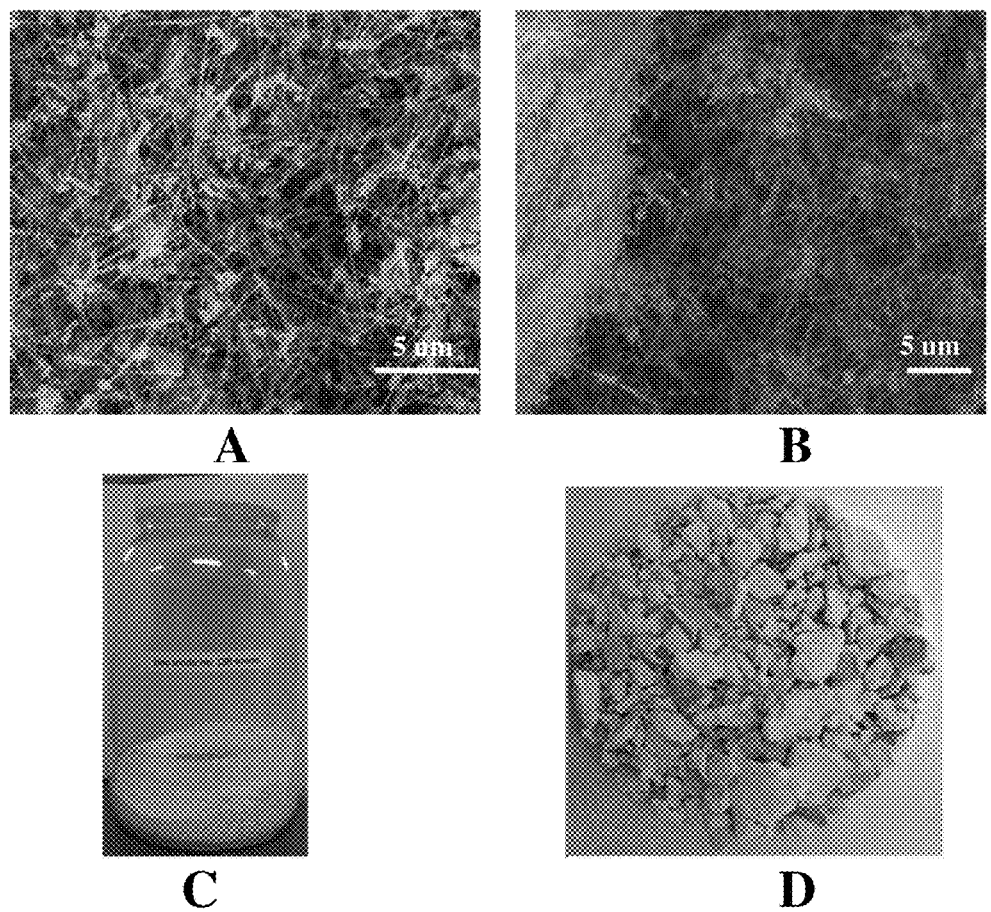
FIG. 7
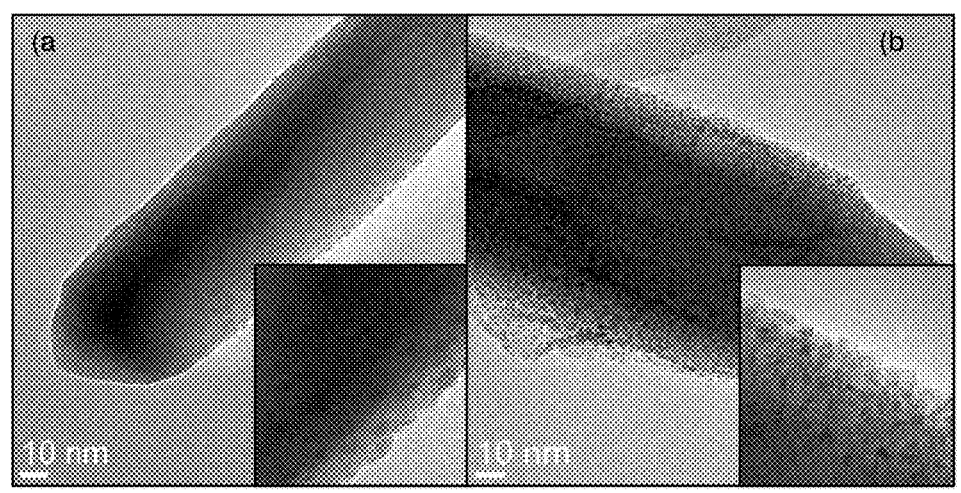

FIG. 10
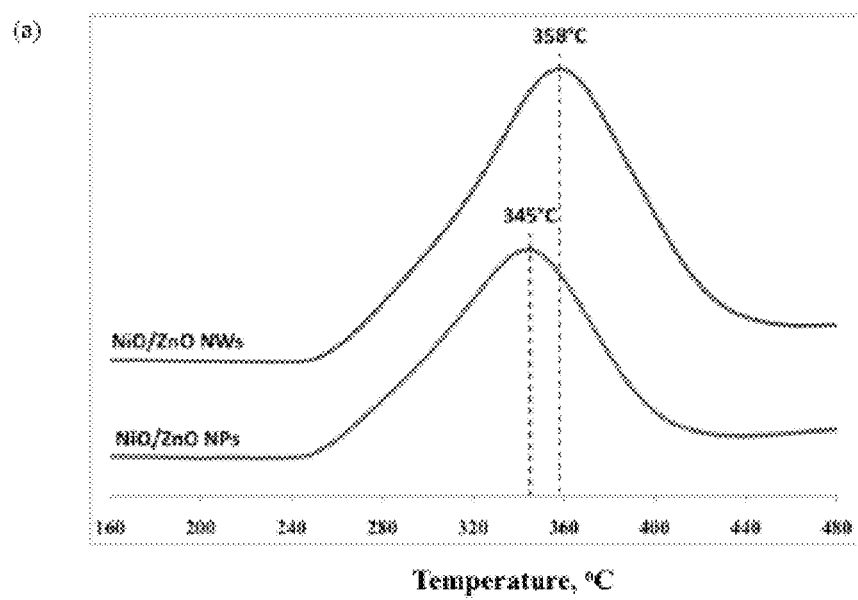
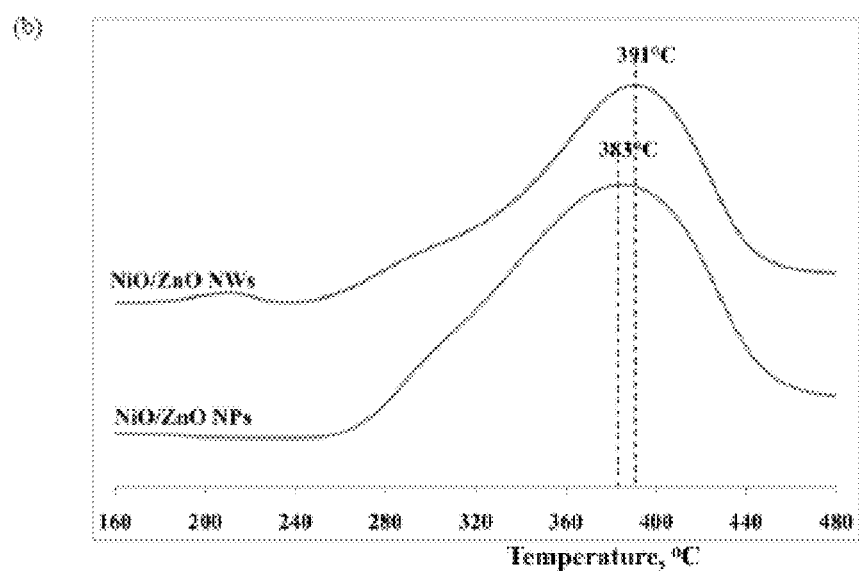
FIG. 11

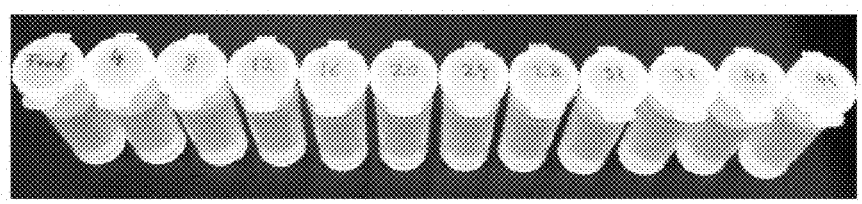
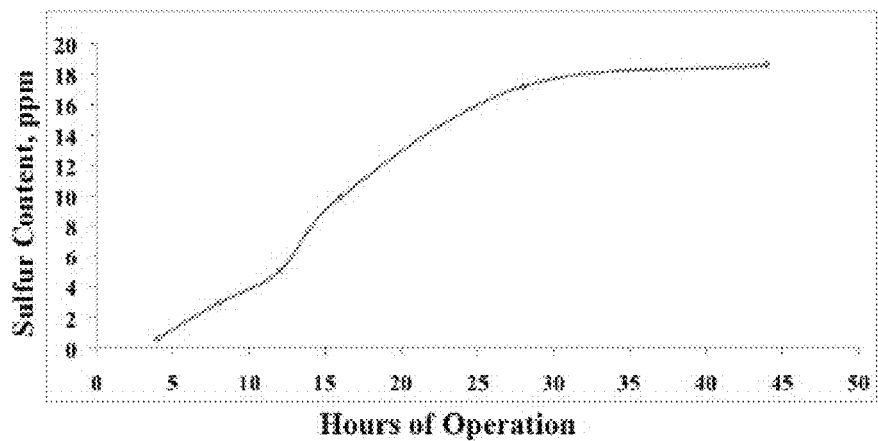
FIG. 14
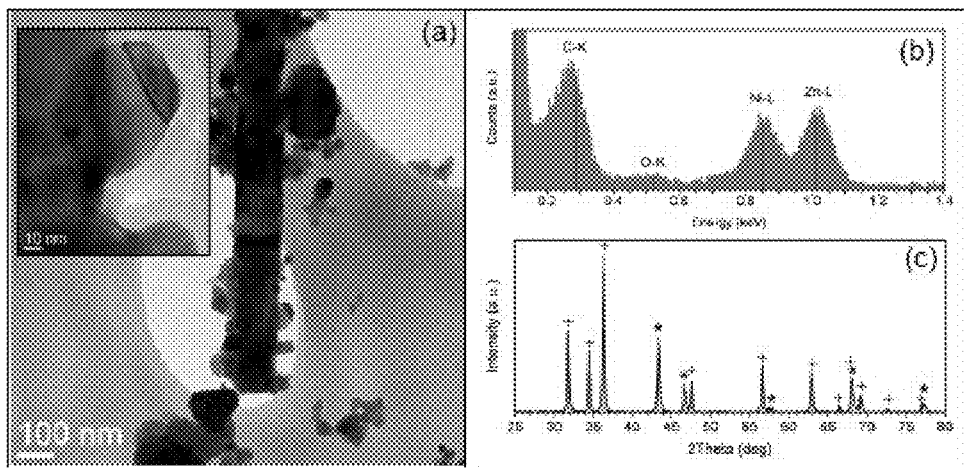
FIG. 15

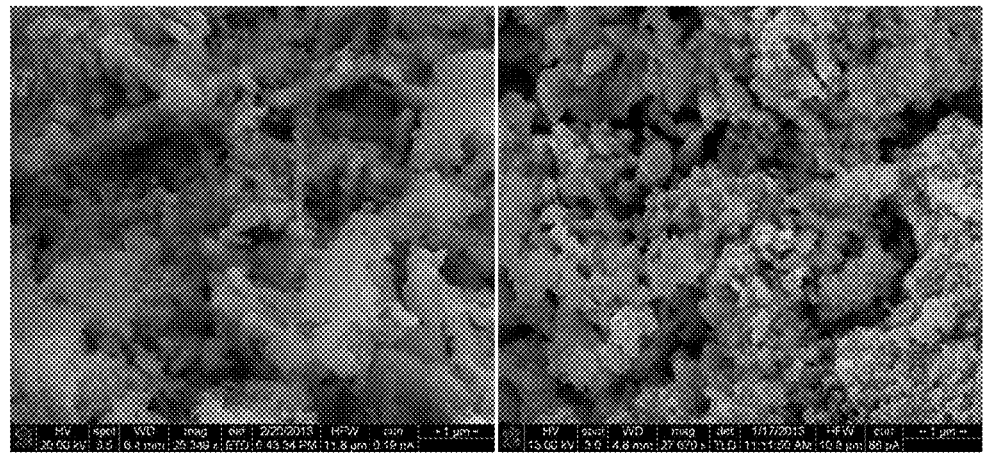
Figure 19A                                    Figure 19B
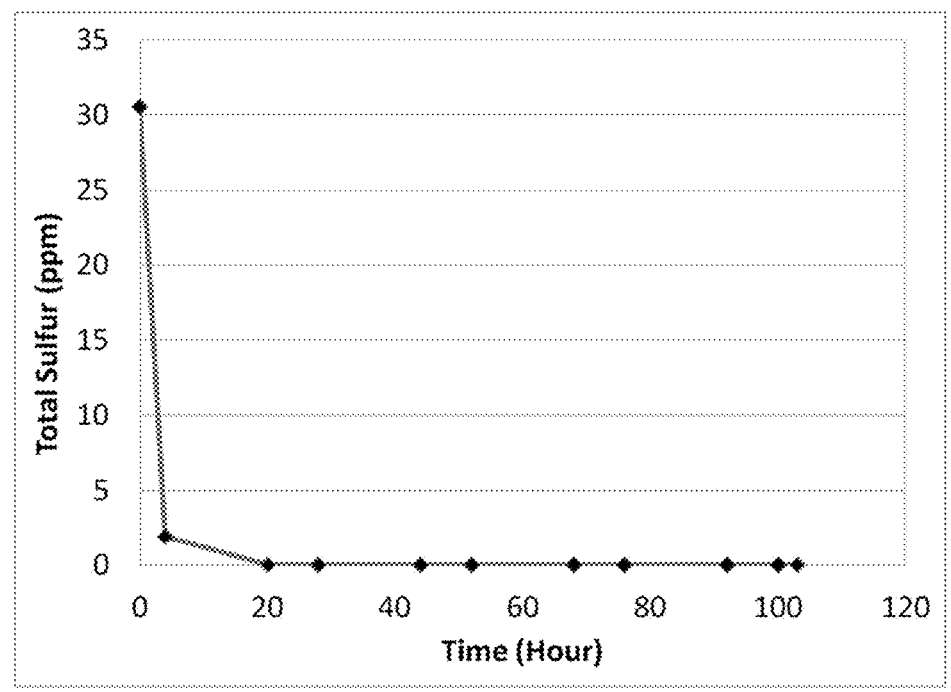
Figure 20

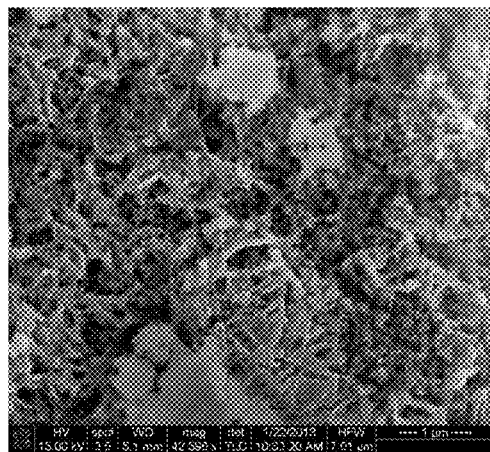 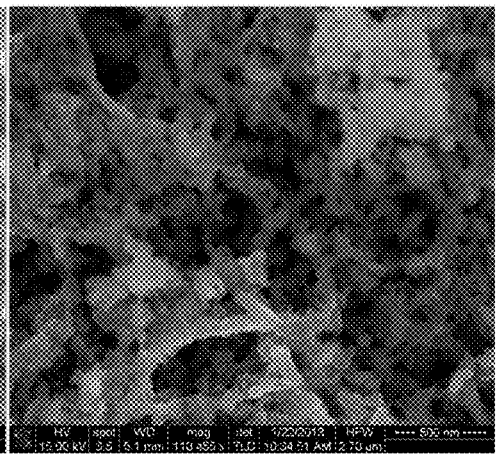
Figure 21A                                    Figure 21B
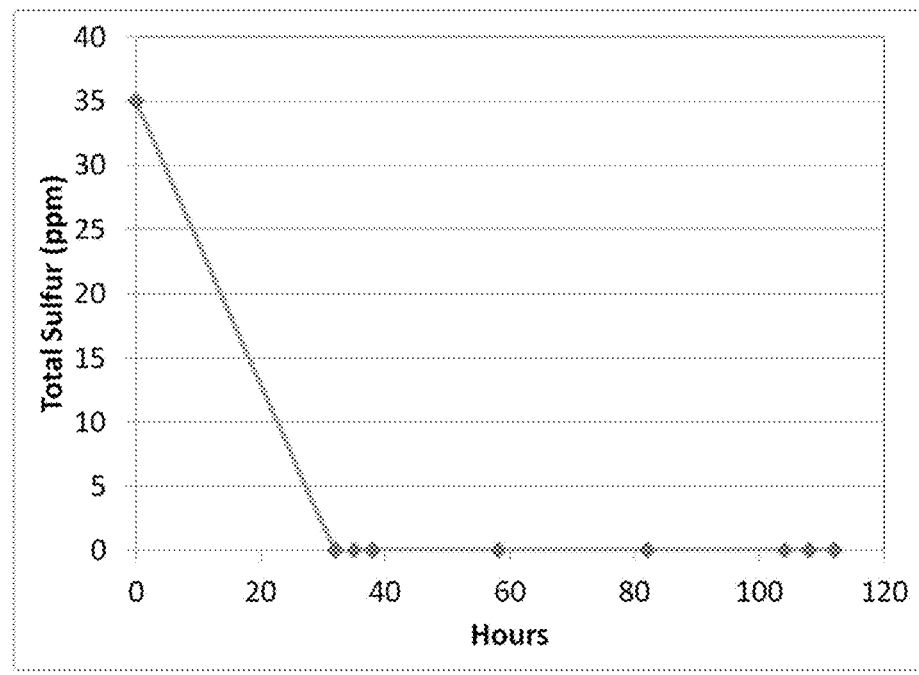
Figure 22

US 10,030,201 B1

CATALYST COMPOSITION AND METHODS FOR DESULFURIZATION

TECHNICAL FIELD

The presently-disclosed subject matter relates to catalyst compositions and methods for desulfurization. In particular, the presently-disclosed subject matter relates to catalyst compositions and methods for desulfurization that make use of zinc oxide nanowires that include catalytically-active metal particles as an active phase.

BACKGROUND

The reduction of sulfur content in gasoline and diesel oil is an important means for improving air quality because sulfur in transportation fuel can irreversibly poison noble metal catalysts found in automobile catalytic converters. Further, due to their high energy density, ease of storage, and well-established distribution-infrastructure, transportation fuels such as gasoline, jet fuel, and diesel oil are perfect candidates for high efficiency fuel cells. Nevertheless, to protect the reforming catalyst and the electrodes of the fuel cell system from deactivation, the sulfur concentration of the fuel needs to be ultra-low (e.g., less than 0.1 ppm). Thus, there has been a growing demand for ultra-low sulfur fuels driven by legislative pressure and, in particular, the growing application of fuel cells. To deliver these ultra-low sulfur fuels, ultra-deep desulfurization of gasoline and diesel oil has become an increased focus of research with many diverse approaches.

One approach is hydrodesulfurization (HDS). Conventional HDS utilizes alumina- and silica-supported cobalt or nickel or molybdenum catalysts. However, despite significant improvements in decreasing sulfur content, it is still difficult to achieve essentially sulfur free fuels with the typical catalysts used for HDS. This is commonly believed to be due to the slow reactivities of sterically hindered dimethyl dibenzothiophenes [1-5] and other thiophene-based compounds, examples of which are shown in FIG. 1. Typical catalysts for hydrogenation and conventional HDS are transition metals of the Group-9 and Group-10 elements, such as cobalt, nickel, rhodium, palladium, and platinum. Nickel (Ni) and cobalt (Co) with various promoters and on various supports are extensively used, and carbon-sulfur cleavage under hydrogen pressure is often achieved via a classical hydrogenolysis reaction scheme. Indeed, extensive studies on the catalytic properties of transition metal catalysts have shown that Ni and Co have significant catalytic activity [9-14], with conventional catalysts like Co(Ni)—Mo/Al$_2$O$_3$ achieving bulk sulfur removal from gasoline and natural gas with residual organo-cyclic sulfur compositions down to 30 wt ppm [15]. Further, in a hydrogen atmosphere, the metal active phase, i.e. nickel, is able to cleave the sulfur off the "difficult" cyclic compounds; thereby converting the sulfur into hydrogen sulfide (H$_2$S). However, in these catalysts, the active nickel phase is slowly sulfided by the resulting H$_2$S forming NiS, as shown in the following reaction:

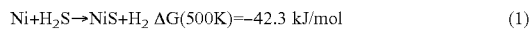

$$Ni + H_2S \rightarrow NiS + H_2 \quad \Delta G(500K) = -42.3 \text{ kJ/mol} \quad (1)$$

As a result of the above reaction, as nickel undergoes conversion to NiS, the adsorption activity decreases and eventually vanishes completely. In industry, the catalyst will then either have to be regenerated or replaced once a certain threshold breakthrough of sulfur is detected in the product stream. Consequently, there are several actively researched alternative methods that aim at removing sulfur to levels below 10 ppm, including oxidative routes for diesel, chemical conversion methods, non-destructive adsorption, extraction, biodesulfurization, and, in particular, reactive adsorption [5-8]. In reactive adsorption, once a conventional metal active phase of a catalyst converts all "difficult" organic sulfur species under hydrogen to H$_2$S, an adsorptive phase, usually the base oxide support material, accepts, and permanently stores the sulfur portion of the H$_2$S, as storage which is typically necessary as H$_2$S, when present downstream of the catalyst adsorbent, tends to recombine with olefins to form relatively stable mercaptanes.

With further regard to reactive adsorption, it is appreciated that a nickel active surface can catalyze the cleaving of cyclic sulfur compounds such as thiophenes. As indicated above, however, during the process, the active Ni sites get sulfided to NiS thereby extinguishing catalytic activity. As such, a catalyst that retains its catalytic activity over an extended period of time during desulfurization would be both highly desirable and beneficial.

BRIEF DESCRIPTION OF THE DRAWINGS

FIG. 7 includes SEM images and photographs of ZnO nanowire powders collected in cup at the bottom (A, C) and from the high surface area filter (B, D) of the plasma jet reactor, where the photographs of the bottles contain approximately 150 grams of ZnO NW powder collected in cup and approximately 6 grams of ultrafine NW powder (approximately 5-20 nm diameter, and greater than 20 microns length);

FIG. 10 is a high-resolution TEM (HRTEM) image showing EDX mapping of individual ZnO NWs and showing Ni decoration of the ZnO NWs;

FIG. 11 includes graphs showing temperature-program-reduction (TPR) profiles of NiO supported on ZnO NWs and ZnO NPs, and showing that Ni—ZnO support interactions are stronger with NWs for both Ni precursors used, namely NiAc(a) and NiFt (b);

FIG. 14 includes an image and a graph showing desulfurization test results of catalysts comprised of 15% Ni, 20% γ-$Al_2O_3$, and 65% ZnO NW, including photographs of diesel samples taken at various time scales during testing (a), and the quantification of sulfur content in the treated diesel (b);

FIG. 15 includes a TEM image of a spent Ni/ZnO NW sample from NiFt precursor (a), where the inset shows a large NiZn particle covered with a thick carbon layer, and further includes graphs showing EDS-TEM spectrum obtained from a single NiZn particle (b) and XRD pattern measured from this sample showing ZnO (crosses) and NiZn (stars) peaks (c);

FIGS. 19A and B are SEM micrographs of Ni—ZnO—$Al_2O_3$ nanowire catalysts generated through Example 7;

FIG. 20 is the desulfurization curve using the catalyst of Example 7;

FIGS. 21A and B are SEM micrographs of Ni—ZnO—$Al_2O_3$ nanowire catalysts generated through Example 8;

FIG. 22 is the desulfurization curve using the catalyst of Example 8;

DESCRIPTION OF EXEMPLARY EMBODIMENTS

Figure 1:
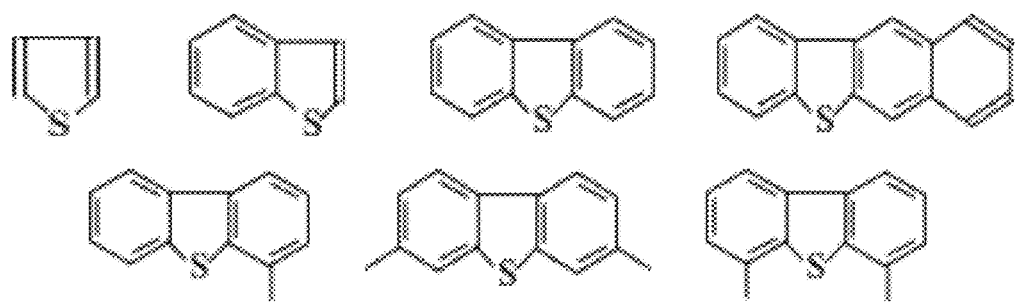
FIG. 1 includes chemical structures of difficult-to-remove aromatic sulfur compounds remaining within hydrocarbon fuels after conventional hydrodesulfurization (HDS) treatment with Co(Ni)Mo—Al$_2$O$_3$.

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

While the terms used herein are believed to be well understood by one of ordinary skill in the art, definitions are set forth herein to facilitate explanation of the presently-disclosed subject matter.

Unless defined otherwise, all technical and scientific terms used herein have the same meaning as commonly understood by one of ordinary skill in the art to which the presently-disclosed subject matter belongs. Although any methods, devices, and materials similar or equivalent to those described herein can be used in the practice or testing of the presently-disclosed subject matter, representative methods, devices, and materials are now described.

Following long-standing patent law convention, the terms "a," "an," and "the" refer to "one or more" when used in this application, including the claims. Thus, for example, reference to "a nanowire" includes a plurality of such nanowires, and so forth.

Unless otherwise indicated, all numbers expressing quantities of ingredients, properties such as reaction conditions, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The presently-disclosed subject matter includes catalysts and methods for desulfurization that are based, at least in part, on the discovery that certain zinc oxide (ZnO) supports can assist in ensuring that an active nickel phase is present during deep desulfurization processes, in part by the following regenerative step:

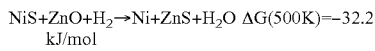

$NiS+ZnO+H_2 \rightarrow Ni+ZnS+H_2O$  $\Delta G(500K)=-32.2$ kJ/mol    (2)

Figure 2:
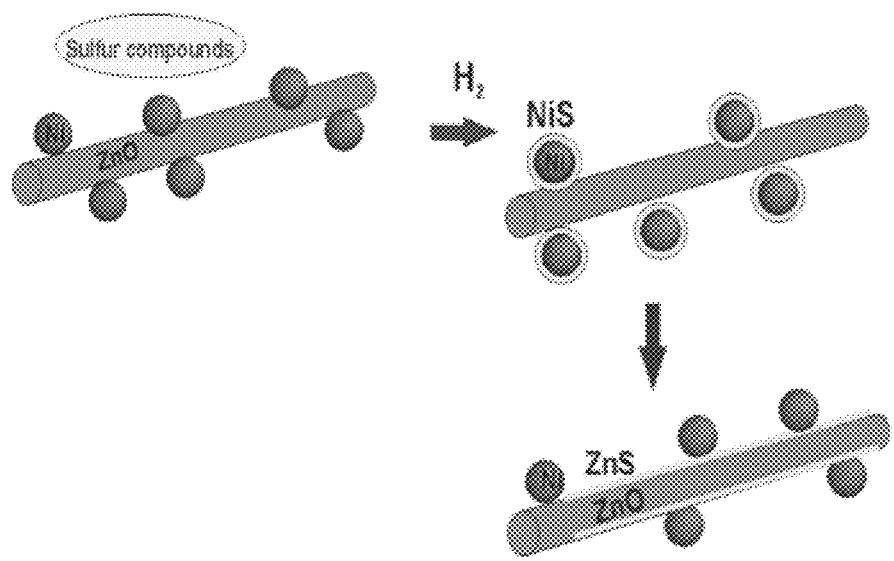
FIG. 2 is a schematic diagram illustrating the reactive adsorption of thiophenic compounds on nickel (Ni) decorated zinc oxide (ZnO) nanowires (NWs), and further illustrating the ZnO NW support allowing the Ni sites to remain free of sulfur and thereby remain active for hydrogenolysis.

In some embodiments, the presently-disclosed subject matter includes compositions that make use of zinc oxide (ZnO) nanowires (NWs) as catalyst supports to maintain a steady fraction of active Ni surface sites for ultra-deep hydrodesulfurization (HDS; see, e.g., FIG. 2) by converting any NiS that is produced during the desulfurization process to ZnS. In some embodiments of the presently-disclosed compositions, the catalytic activity can be extended until any accessible ZnO is converted to zinc sulfide (ZnS), such that the compositions can effectively be used for ultra-deep HDS to remove thiophenes that are still present in conventionally processed HDS streams down to zero ppm (e.g., from 20-50 ppm). Furthermore, in addition to the reactivity aspect, the compositions of the presently-disclosed subject matter allow for a catalyst design that includes favorable active metal dispersion via size distribution, morphology, metal support interaction and non-sinterability for maintaining activity.

In some embodiments, a catalyst composition is provided that comprises zinc oxide nanowires having one or more catalytically-active metal particles attached to a surface of the zinc oxide nanowires. As used herein, the phrase "catalytically-active metal particles" is used to refer to metal particles that are capable attaching to a metal nanowire and are further capable of then reacting with a sulfur compound to thereby remove an amount of sulfur from a sulfur-containing composition, such as, for example, from a fuel source or other liquid or gas hydrocarbon source. In this regard, in some embodiments, the catalytically-active metal particles are comprised of a metal selected from nickel, cobalt, molybdenum, tungsten, copper, and platinum. In some embodiments, the catalytically-active particles are nickel particles.

As described in further detail below, in some embodiments of the presently-disclosed compositions, the catalytically-active metal particles, such as the nickel particles, cover a substantial portion of the zinc oxide nanowires so as to provide a sufficient amount of a metal (e.g., nickel) active phase that can be used for desulfurization. In some embodiments of the presently-disclosed subject matter, a diameter of each of the catalytically-active metal particles is less than about 20 nm so as to allow multiple metal particles to be attached to a surface of the zinc oxide nanowires, but yet still allow for a sufficient amount of the active phase metal to be available for desulfurization. In some embodiments, the diameter of each of the metal particles, such as the nickel particles, is about 1, about 2, about 3, about 4, about 5, about 6, about 7, about 8, about 9, about 10, about 11, about 12, about 13, about 14, about 15, about 16, about 17, about 18, about 19, or about 20 nm in diameter. In some embodiments, the diameter of the nickel particles is about 2 nm to about 20 nm; and preferably, the diameter is about 2 nm to about 8 nm. In a preferred embodiment, the catalytically-active metal is loaded onto the zinc oxide nanowires such that the resulting coated nanowire comprises from about 9 wt % to about 30 wt % catalytically-active metal. In a more preferred embodiment, the catalytically-active metal is nickel.

With regard to the zinc oxide nanowires onto which the catalytically-active metal particles are attached, in some embodiments, the zinc oxide nanowires are of a sufficient length and diameter, so as to provide a surface area onto which a number of metal particles may be attached. For example, in some embodiments, the zinc oxide nanowires are about 100 nm to about 100 µm in length, and preferably are about 100 nm to about 10 µm in length. In some embodiments, the zinc oxide nanowire is about 1 nm to about 150 nm in diameter, preferably about 5 nm to about 150 nm in diameter, and more preferably about 5 nm to about 30 nm in diameter, so as to provide zinc oxide nanowires having an increased amount of surface area for attaching the catalytically-active metal particles e.g., nickel particles. In some embodiments, the zinc oxide nanowires have a surface area of at least 5 $m^2$ per gram of nanowires, and preferably greater than about 20 $m^2$ per gram of nanowires.

Optionally, the coated nanowires of the present invention may further comprise gamma alumina ($\gamma$-$Al_2O_3$). In a representative embodiment, $\gamma$-$Al_2O_3$ comprises up to about 35 wt % of the coated nanowires.

The zinc oxide nanowires used in accordance with the presently-disclosed subject matter can, of course, be synthesized by a variety of methods known to those of ordinary skill in the art. In some embodiments, however, a method of synthesizing a catalyst composition is provided where the zinc oxide nanowires are synthesized through the use of a plasma discharge reactor to create zinc oxide nanowires of a sufficient quality and in a sufficient quantity for industrial desulfurization applications. For example, in some embodiments, a catalyst composition is synthesized by first activating a plasma discharge reactor to create a plasma discharge having a desired power. Typically, the plasma discharge reactor utilized in accordance with the methods of the present invention is one that is capable of producing a plasma discharge having a suitable power, such that sufficient heat is created to melt and facilitate the oxidation of the zinc metal powder, via the generation of oxygen radicals by the plasma discharge, and thereby form the zinc oxide nanowires. For example, in one implementation, a microwave plasma discharge reactor can be utilized that makes use of a gaseous mixture of $N_2$, $O_2$, and $H_2$ with an overall $O_2$ concentration of about 2 to about 20% (e.g., about 17.5%) and an $H_2$ flow of 0-500 sccm that is fed into the top of the plasma discharge reactor to ignite and maintain a plasma discharge at powers ranging from 200 W to 3 kW (e.g., 1000 W) under atmospheric pressure conditions. In some embodiments, the flow rate of the gas is about 15 lpm into the plasma discharge reactor.

Such pressure microwave plasma discharge reactors are further described in Kumar, et al. *J Phys Chem C* 2008, 112, 17750, and in Kim, et al. *Inf Midem-J. Microelectron, Electron. Compon. Mater.* 2008, 38, 237, each of which are incorporated herein by this reference. However, it is further contemplated that other plasma discharge reactors, utilizing other gaseous mixtures, power ranges, and/or pressure conditions can also be used without departing from the spirit and scope of the present invention. Moreover, in addition to plasma discharge reactors, other means for creating oxygen radicals can also be used in accordance with the presently-described methods for creating nanowires, including, but not limited to, microwave discharges at atmosphere or at low temperature; radio frequency discharges at low pressures and at atmospheric pressures, hot filaments or wires that are capable of producing plasma discharges, other means for producing high thermal temperatures, various chemical means for producing oxygen radicals (e.g., ozone), as well as many other means for producing oxygen radicals.

Following the activation of the plasma discharge reactor, a zinc metal powder is then fed into the plasma discharge reactor described herein above and is exposed to the plasma discharge for a predetermined time period to thereby create zinc oxide nanowires. In some embodiments, the zinc metal powder is fed into the plasma discharge reactor at a rate of about 1 g of zinc metal powder per minute. In some embodiments, the zinc metal powder comprises particles of zinc metal that, in some embodiments, each has a diameter of about 1 µm to about 5 µm.

In exposing the zinc metal powder to the plasma discharge, the length of the first predetermined time period will, of course, depend on the particular gaseous mixture and pressure conditions used with the plasma discharge reactor, and/or the power of the plasma discharge. However, it has been experimentally observed that by using a plasma discharge reactor at powers ranging from about 200 W to 5 kW, the zinc oxide powder can be exposed to the plasma discharge for about 5 seconds to about 15 minutes or about 30 minutes to create nanowires of a sufficient quality for industrial applications. Of course, to the extent it may be desired, the quality and morphology of the nanowires can be adjusted by varying the exposure time and can be adjusted for a particular application using only routine experimentation. In this regard, in some embodiments, the phrase "zinc oxide nanowires" is used interchangeably with the phrase "zinc oxide nanowire powders."

With further regard to the step of exposing the mixture of the zinc metal powder to the plasma discharge, in some implementations, the plasma discharge reactor can be positioned such that the plasma discharge is oriented in a direction that allows the transition metal oxide nanowires to be formed by direct gas phase synthesis or by a method where the mixture is placed on a substrate (e.g., foil) prior to exposing the mixture to the plasma discharge. Such positioning of a plasma discharge reactor is described, for example, in U.S. application Ser. No. 13/183,191, which is incorporated herein by reference in its entirety.

Regardless of the orientation of the plasma discharge reactor, however, once the zinc oxide nanowires have been synthesized, the nanowires are then combined or otherwise contacted with catalytically-active metal particles to thereby attach one or more catalytically-active metal particles to a surface of the zinc oxide nanowires. For example, in some embodiments, nickel particles are attached to the surface of the zinc oxide nanowires by combining the nickel particles with a nickel-containing solution, such as, for example, nickel acetate or nickel formate precursors dispersed in an aqueous solution. Once combined, the resulting solution including the zinc oxide nanowires and the nickel particles can then be thermally decomposed at temperatures of about 300° C. to about 400° C. to produce zinc oxide nanowires having the nickel particles attached to their surface. As another example, in some embodiments, nickel oxide particles can be attached to the surface of zinc oxide nanowires by combining the zinc oxide nanowires with nickel oxide particles and then exposing the mixture to a hydrogen reduction using temperature between about 340° C. and about 400° C. for about 0.5 to about 3 hours.

In some embodiments, by combining the zinc oxide nanowires with the catalytically-active metal particles, an amount of catalytically-active metal particles (i.e., nickel particles) attached to the zinc oxide nanowires is about 3 percent to about 20 percent by weight as it is believed that lower than about 3 percent can act to reduce the overall catalytic activity of the metal particles, while greater than about 20% by weight of the metal particles can act to increase agglomeration behavior.

Further provided, in some embodiments of the presently-disclosed subject matter, are methods of removing a sulfur compound from a fuel or other liquid or gas hydrocarbon source. In some embodiments, a method of removing a sulfur compound from a fuel is provided that comprises the steps of: providing a catalyst composition including zinc oxide nanowires having one or more catalytically-active metal particles attached to a surface of the zinc oxide nanowires; and contacting an amount of the fuel with the catalyst composition for a predetermined amount of time and at an elevated temperature. In some embodiments, the fuel is selected from jet fuel, gasoline, and diesel.

As one exemplary implementation of a method of removing a sulfur compound of the presently-disclosed subject matter, in some embodiments, a catalyst composition of the presently-disclosed subject matter is first provided and an amount of a fuel or other liquid or gaseous hydrocarbon feed is pumped or otherwise flowed over a bed of the catalyst composition for a period of time and at a temperature sufficient to remove a desired amount of sulfur from the fuel or hydrocarbon feed. The particular period of time and the temperature at which the desulfurization process is carried out will, in certain embodiments, depend on the amount of the catalyst composition that is used, the amount of fuel to be processed, and the desired level of desulfurization. However, it has been further experimentally observed that exposing a catalyst composition to a fuel for a time period of about 12 to about 20 hours and at a temperature of about 400° C. to about 500° C. to sufficient remove the majority of the sulfur content in a sample of interest (see, e.g., FIG. 7).

With respect to the sulfur compounds removed by the presently-disclosed catalyst compositions, in some embodiments, the sulfur compounds comprise an aromatic sulfur compound, such as those that are generally regarded as difficult to convert to $H_2S$ in traditional hydrodesulfurization processes. For example, in some embodiments, the sulfur compound is a thiophene-based compound or, in other words, a sulfur compound containing one or more thiophene groups, such as those shown in FIG. 1. In some embodiments, an aromatic portion within the liquid or gaseous hydrocarbon feed is less than about 5%. In some embodiments of the presently-disclosed methods, the thiophene-based compounds in the gaseous or liquid hydrocarbon feed are present in an amount of less than about 50 ppm.

With further regard to the methods of removing a sulfur compound in accordance with the presently-disclosed subject matter, in some embodiments, the catalyst compositions are further combined with alumina and/or clays to produce an extrudate having improved crush strength and/or to assist with hydrogenation reactions that occur during desulfurization. In some embodiments, the alumina and/or clays are combined with the catalyst compositions in an amount of about 20% by weight of the catalyst composition. In some embodiments, extrusions are created that include pores having volumes in the range of between about and about 4 ml/g.

The presently-disclosed subject matter is further illustrated by the following specific but non-limiting examples.

EXAMPLES

Figure 3:
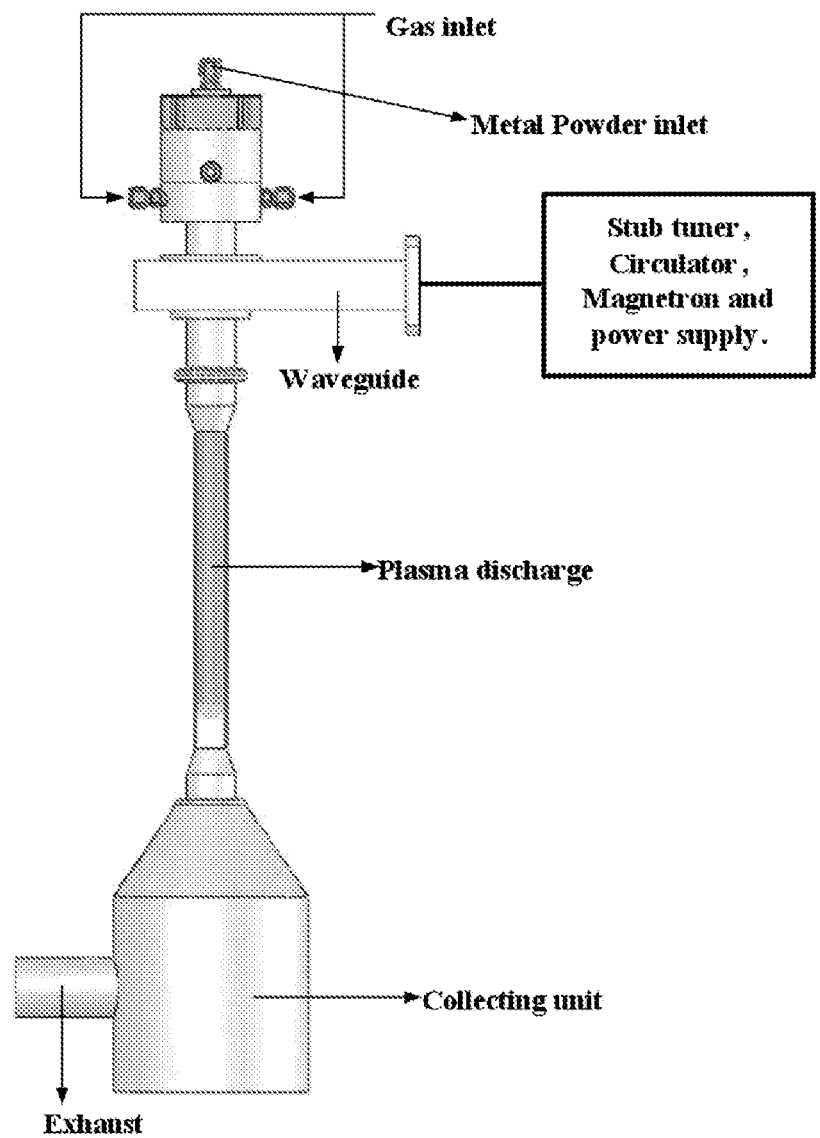
FIG. 3 includes a schematic diagram of a microwave plasma jet reactor used in accordance with the presently-disclosed subject matter.

Materials and Methods for Examples 1-5
Zinc Oxide NW Powder Production:
Bulk production experiments were performed using an atmospheric plasma jet based reactor as shown in schematic in FIG. 3 and described previously [29]. In this reactor, micron scale zinc metal powders are supplied from the top using a powder sifter and the resulting zinc oxide nanomaterials are collected using a filter bag. Several studies were performed to optimize continuous production of ZnO NW powders. The feed powder consisted of Zn microparticles (1-45 microns). A feed rate of 1 g/min, a plasma power of 1 kW, $O_2$ flow rate of 2.5 lpm, $N_2$ flow rate of 12.5 lpm were used respectively.

Figure 4:
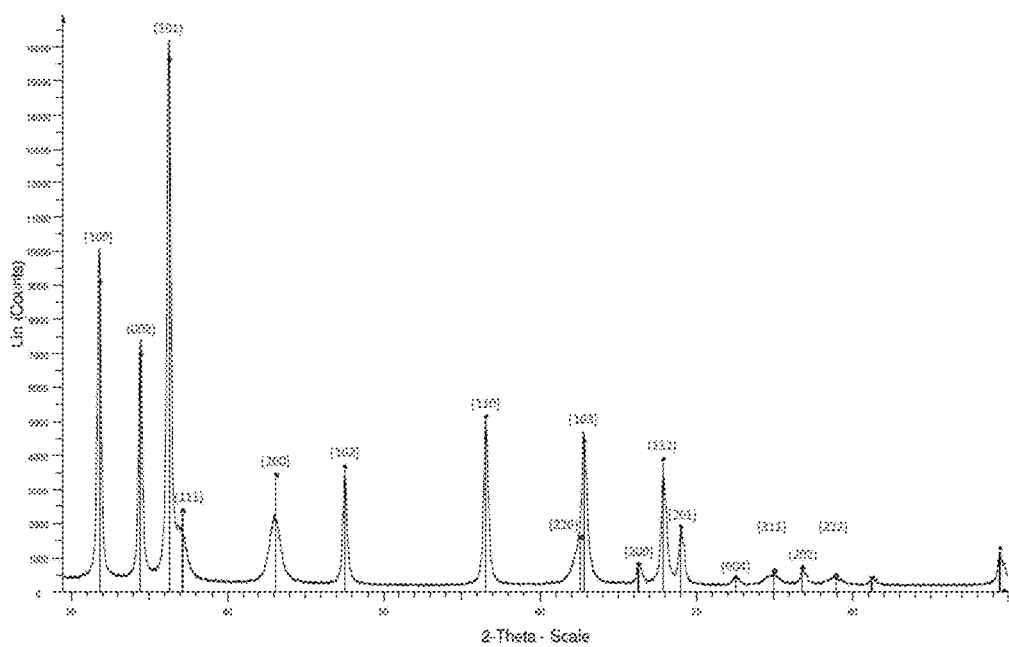
FIG. 4 is a graph showing the X-ray diffraction (XRD) pattern of a Ni/ZnO NW catalyst and further showing hexagonal wurtzite ZnO and face-centered cubic bunsenite phases with plane indices.
Figure 5:
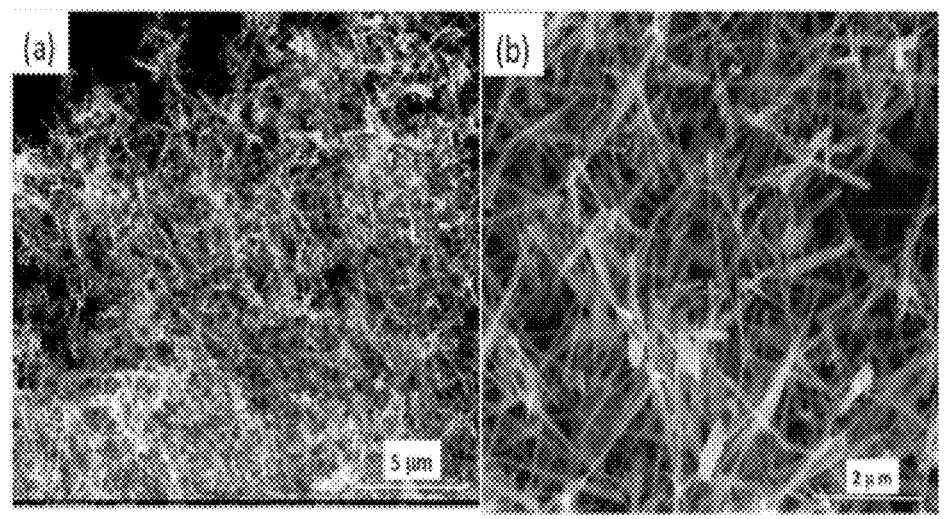
FIG. 5 includes scanning electron microscopy (SEM) images of ZnO NWs impregnated with 20% Ni after calcination at 400° C.

Nickel Impregnation onto ZnO NW Powders:
Impregnation with nickel acetate (NiAc) solution was chosen to deliver the active Ni phase onto the ZnO NWs. The ZnO NW powder and NiAc hexahydrate are mixed for a target Ni:ZnO ratio of 3:7 using DI water and a small quantity of ammonium hydroxide solution. The pH is maintained at 9 and the mixture is ultrasonicated for five minutes to assure proper dispersion and exposure of the ZnO NWs. The suspension is dried by evaporating water at 95° C. The resulting greenish flakey powder is calcined in air at 400° C. for two hours. The calcined powder is loosely crushed in a mortar for x-ray diffraction (XRD) analysis using Bruker D8. The XRD pattern shown in FIG. 4 shows the hexagonal wurtzite ZnO for nanowires and the face-centered cubic bunsenite phase for NiO crystals. The mean NiO particle size is estimated using XRD data to about 11 nm. Aside from the identification of the two desired phases, the Ni loading is also confirmed to be 15% by wt. NiO. The samples are supported on gold sputtered silicon substrates and examined using a field emission scanning electron microscope (FEI NanoSEM). At 15% by wt, the surface coverage of ZnO NWs with NiO is less than 50%. SEM images shown in FIG. 5 show that the morphology of ZnO NWs after nickel impregnation is still intact.

Catalyst Preparation:

ZnO NW powder (10.28 g) is suspended in a one liter beaker filled with de-ionized water and sonicated for 15 minutes. The suspension is allowed to settle for 20 minutes before the supernatant is vacuum-filtered through a paper filter with a 2.5 micron pore size. The filter with the attached wet filter cake is dried for about one hour at 110° C., after which the dried ZnO NWs are collected from the filter. The final yield of high purity ZnO NW was 70% or 7.2 g. For a target weight composition of 64:20:16 ($ZnO:Al_2O_3:Ni$), 5.84 g of the high quality product is mixed with 1.82 g of γ-alumina and 6.35 g of NiAc. The product mixture is suspended in 250 ml of de-ionized water and ultra-sonicated for eight minutes to re-disperse the ZnO NW filter cake flakes. The beaker with the pale green suspension is put in a furnace at about 80° C. overnight. Once 150 ml of water are evaporated, the resulting creamy substance is further heated to 150° C. with occasional stirring. The final 40 ml are thick enough to extrude the dough into extrusions, which are then dried overnight at 70° C. The final drying temperature is ramped up to 250° C. at one degree per min. rate. The product extrusions become darker but stay greenish until they are calcined at 400° C. for two hours, at which point they almost immediately turn dark grey. After a cool-down period, the extrusions are sized to five by two millimeter pieces of which 10 ml are measured out for testing.

Desulfurization Studies:

The testing was done using a model hydrocarbon stream spiked with an assortment of aforementioned "difficult" aromatic sulfur species in a setting that closely resembles industry conditions. A diesel feed is employed that contains aromatics to see if the catalyst also conveys a noticeable level of regular hydrogenation activity. A standard diesel feed was acquired from Exxon containing 25% of various aromatic and poly-aromatic compounds. The sulfur content of 20 ppm consisted mostly of thiophene (10 ppm), benzothiophene (3 ppm), di-benzo-thiophene (3 ppm), and a few moderately and severely sterically hindered di-benzo-thiophenes. The final catalyst extrusions are diluted with SiC (7:1) and loaded in a fixed bed reactor. The NiO particles are reduced to metallic Ni using one liter per minute hydrogen flow over the bed at 430° C. for 16 hours.

For testing, the hydrogen flow rate is set at 0.098 l/min at a pressure of 435 psig, the reactor heaters fired at 190° C., and the diesel pump rate is set to 0.5 ml/min, which, relative to the superficial volume of the catalyst extrusions (10 ml), translates into a liquid hourly space velocity (LHSV) of 3 $h^{-1}$. Product samples are collected every four hours.

Temperature programmed reduction (TPR) runs are conducted on NiO decorated ZnO NWs to study the sintering susceptibility of the NiO/ZnO NW system compared to NiO supported on commercial ZnO NPs. The two samples are loaded with 20% Ni (from acetate) and reduced in a nitrogen stream with five percent hydrogen on a Micromeritics Autochem II 2920. The ramp rate of the reduction is 10° C./min and the hydrogen consumption signal is recorded from 30° C. to 500° C.

The surface area of a plain ZnO NW sample was measured via the Brunauer-Emmett-Teller (BET) method using nitrogen at 77K on a vacuum volumetric gas-sorption Micromeritics TriStar 3000.

Example 1—Bulk Production of ZnO NW Powders

Previous NW synthesis methods have utilized clusters of gold or other catalytic metals (Ni or iron) to catalyze the growth via vapor-liquid-solid (VLS) approaches [30, 31]. In the VLS mechanism, each metallic cluster catalyzes dissolution of gas phase solutes and precipitates the solute or its compounds in one-dimensional form [32]. In the above approach, however, a large quantity of nanoscale catalytic metal clusters with well-controlled sizes was required for producing NWs. Besides, the use of precious metals such as gold was not practical for large-scale synthesis due to cost and rarity. The use of iron was promising, but required high temperatures in excess of 900° C. and had not been demonstrated with continuous production schemes yet.

There have been several interesting routes developed for synthesizing one-dimensional materials without using the above group of metals [33, 34], where high densities of semiconductor NWs could nucleate and grow from micron-sized clusters of low-melting metals [32, 33]. Similarly, the oxides or similar compounds of low-melting metals NWs could be synthesized directly without the use of foreign metal clusters [35-37]. In the schemes involving self-catalyzed or direct reaction, there is no foreign metal involved as a contaminant. Traditionally, the formation of nanoparticles (NPs) was easier and, irrespective of the method used (flame, laser, hot wall, and plasma reactor), the mechanism involved rapid nucleation followed by arrested growth via short residence times in hot reacting zone [38]. However, the same concept could not be applied in the case of NWs where the synthesis must be able to preferentially support growth in one dimension, thus making NW production difficult compared to that of NPs. Many researchers exploited the use of catalysts to grow 1-D structures using substrates in a number of approaches such as thermal evaporation [38], laser ablation [31], hydrothermal synthesis [39], electrodeposition [40], and others. However, despite prior studies showing that synthesis of tin oxide and zinc oxide nanowires is possible using oxidation of respective metal powders using atmospheric plasma jet, it had yet to be determined whether scale-up or large-scale production of such NW powders was possible.

In this regard, several experiments were performed to optimize the conditions, powder feed rate and collection method for developing a scheme for hundred gram scale production of ZnO NW powders. Synthesis of the ZnO NWs was accomplished using an applied microwave power of 1 kW, an overall gas flow rate of 15 lpm, and a raw feed rate of 1 g/min. The gas phase composition consisted of a mixture of $N_2$, $O_2$, and $H_2$ with an overall $O_2$ concentration of 2-20% and an $H_2$ flow of 0-500 sccm. Experiments conducted with lower $O_2$ percentages (<12%) resulted in low quality NWs (lengths of roughly 1 micron) and zinc metal contamination in the product powders. Higher oxygen ratios (>17.5%) resulted in roughly a gram of nanowire powders in 2 mins with >90% purity. Experiments conducted with a raw feed of zinc NPs resulted in short NWs with lengths less than 1 micron, due to the metal source feeding the NW growth being depleted. Large raw feed particles (>20 microns in diameter) resulted in zinc metal contamination in the product powders, due to the inability of the plasma to convert the bulk of the metal particles to metal oxide. Based on these results, it was determined that the preferred raw feed particle size was between 1-5 microns.

The type of powder flow from the feeder in to the plasma zone had an effect on the percent conversion and resulting nanowire characteristics. Agglomerated raw feed resulted in rapid sintering of the individual zinc metal particles, leading to the formation of relatively large zinc metal pebbles. Highly dispersed flow, with raw metal feed powders being showered into the reactor inlet, resulted in a significant improvement in the quality and purity of the resulting NW powders. Without wishing to be bound by any particular theory, it was believed that this was likely due to the rapid oxidation of dispersed powders while reducing the tendency of the raw feed particulates to sinter.

In all nanowire production experiments, the quartz tube wall received substantial deposition with ZnO powder. At the top of the reactor, near the source of the plasma flame, depositions consisted of mostly nanoparticles. This region of the deposition was also where the product mass was most densely concentrated. Downward, the deposition was thinner with morphology predominantly being one-dimensional in nature. At the base of the quartz tube nearly 50% of the deposition mass was accounted for by nanowires with lengths of roughly a micron.

Figure 6:
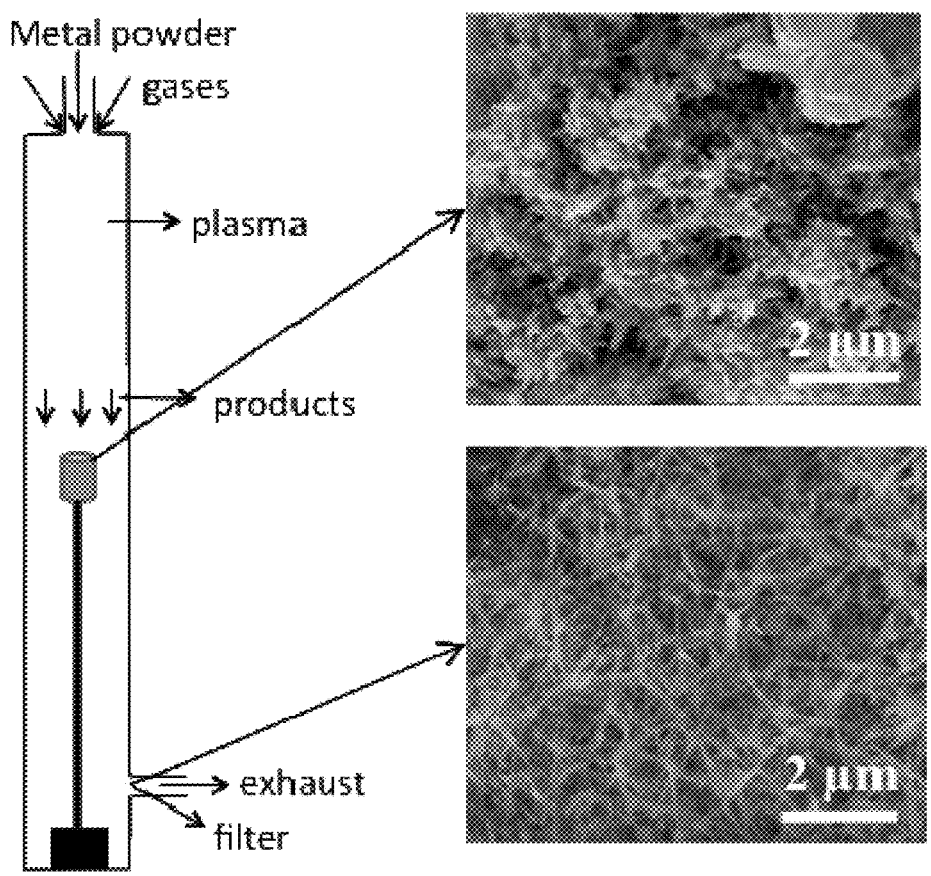
FIG. 6 includes a schematic diagram and SEM image showing ZnO nanowire powders collected at two different locations within a plasma jet reactor.

In order to understand the stages of gas phase oxidation of zinc metal powders, samples were collected at different locations from the gas phase within our plasma reactor as shown in FIG. 6. The data shows various stages of nucleation and growth of zinc oxide nanowires from molten Zn particles. The first sample collected close to plasma zone shows multiple nucleation events from one molten Zn particle. The sample collected at later stages in the reactor showed longer, individual nanowires. The data proves that the Zn metal powder gets oxidized in the gas phase and nucleation and growth of ZnO nanowires result from oxidation of molten Zn particles in the gas phase.

The use of high surface area filters allowed for continuous production runs without causing pressure drop and disruption in production process. Continuous runs resulted in more than hundred grams of ZnO NW powders as shown in FIG. 7. Typical results show that the resulting NWs are typically 1-30 μm in length and diameters from 5 to 50 nm. The preferred plasma power for the synthesis was found to be 1 kW. At less than 1 kW powder no conversion of the Zn powder to ZnO NW was obtained. At powers higher than 1 kW, the Zn powder vaporized and no product was collected in the filter. Also using powders with particle size greater than 10 microns and feed rates higher than 1 g/min resulted in the agglomeration of the feed powders and lowered the conversion. No significant change in the conversion was found when oxygen flow rate was varied between 10-15 lpm. The observations of very long (greater than 20 microns) and thin diameters (about 10 nm) for nanowires collected in the filter were surprising and suggested prolonged growth of nanowires entrained in the gas phase after completely consuming the original metal cluster. Similarly, the SEM images of nanowire aggregates collected from filters indicated hairly ball type entanglements suggesting interesting aggregation patterns of thin and long nanowires in gas phase.

Example 2—In-Situ Decomposition Studies of Ni Precursors on ZnO NWs

Figure 8:
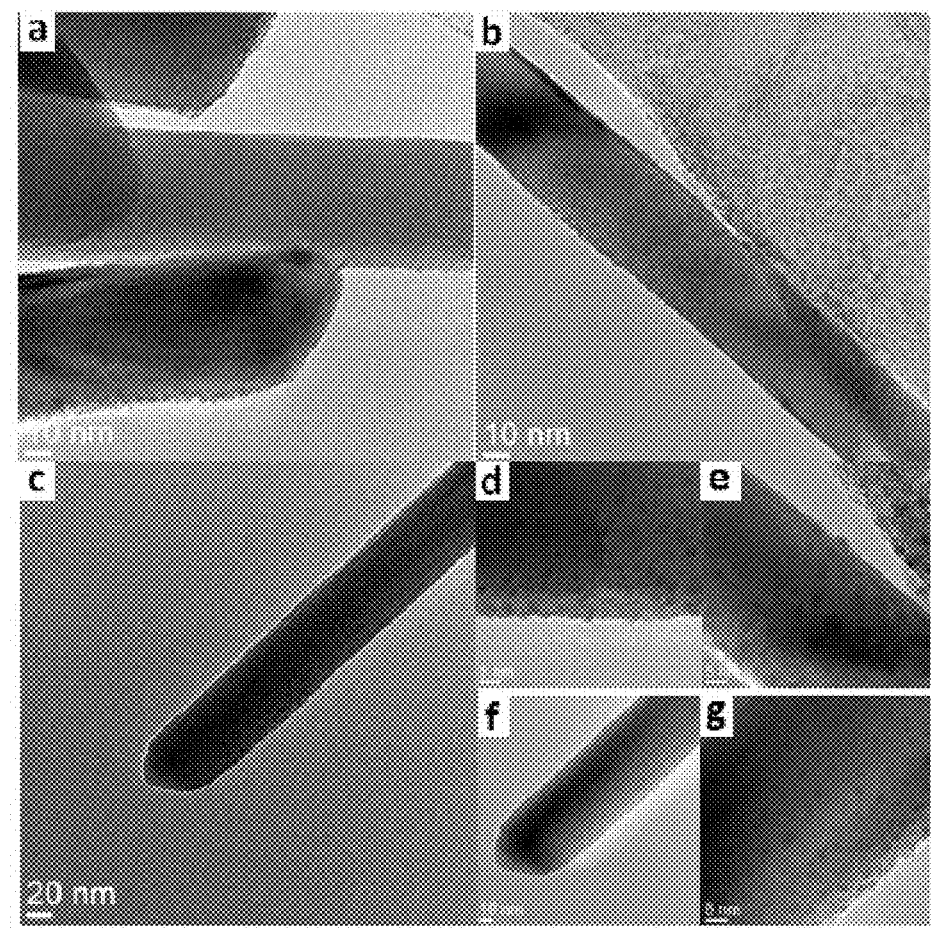
FIG. 8 includes transmission electron microscopy (TEM) images of a Ni-decorated ZnO NW after in situ decomposition of (a) NiAc at 430° C., and (b) NiFt at 410° C.
Figure 9:
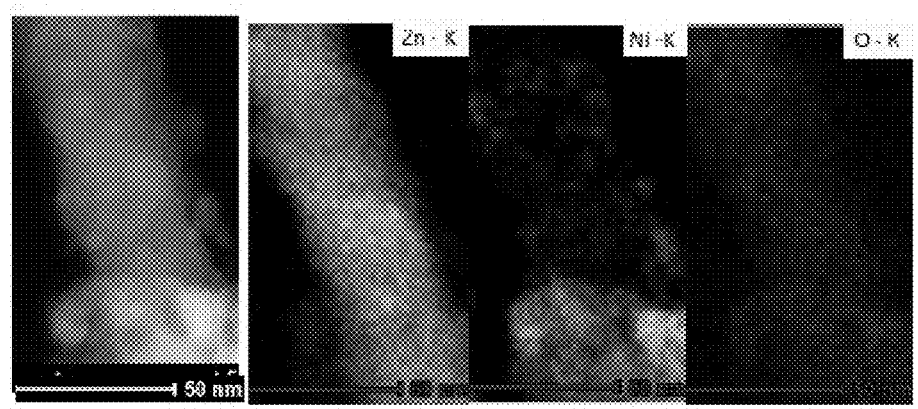
FIG. 9 includes TEM images of in situ calcined NiAc on ZnO NWs (a, b, c), where images (d) and (e) are close-up images of (a) and (b), (f) is a close-up image of (c), and (g) is a close-up image of (f)

The nucleation and evolution of Ni particles on the ZnO NWs via decomposition of NiAc was studied in situ in a transmission electron microscope (TEM) using a heating sample holder. A drop of the suspension/solution (NiAc covered ZnO NWs) was dripped onto a carbon grid, dried, mounted in a furnace-type Gatan 628 Single Tilt Heating Holder, and loaded into a Tecnai F20 FEG TEM chamber for in situ TEM heating studies. At first, a suitable area of the grid with a few well-dispersed ZnO NWs was identified at room temperature. Then the sample was gradually heated with intervals of approximately 50° C. and at each subsequent temperature, after temperature stabilization (approximately 5 min), TEM images were recorded from the selected area to monitor changes. The chamber was under high vacuum which prevented formation of NiO. At ~330° C. Ni nuclei started to emerge from the amorphous NiAc and the average size of formed Ni particles was gradually increasing with the heating temperature. As shown in FIG. 8A, after heating at final temperature of 430° C., dispersion of Ni particles was very high with only a few small agglomerations. Ni particles formed are quasi-spherical and their size averages around 30 Å, which was a good indicator for high catalytic activity. In addition to NiAc, nickel formate dihydrate (NiFt) was also studied as a Ni precursor. In particular, similar in situ thermal TEM decomposition studies were performed and formation of Ni nuclei was observed starting at approximately 370° C. In this case, heating at approximately 410° C., led to the complete decomposition of the precursor and high dispersion of Ni particles on ZnO NWs (see FIG. 8B). Particles were found to be even smaller that in the NiAc sample (down to ~20 Å) and they exhibited a distinct cubic morphology. See also FIG. 9. A set of energy-dispersive x-ray spectroscopy (EDS) elemental maps, including maps of Ni, Z, and O, obtained from a single ZnO NW, confirmed that the NPs decorated onto the ZnO NWs are indeed NiO. For this, a freshly prepared and calcined NiO/ZnO NW sample was ultrasonicated in ethanol, dripped onto a copper grid, dried and loaded into the TEM chamber. The individual elemental maps, which are displayed in FIG. 10, unmistakably show how Ni is distributed in a form of particles and particle clusters over the NW.

TPR studies were performed to gain insight into the support-Ni particle interactions. A reference sample with a nickel loaded ZnO NP powder (surface area=57 m$^2$/g, mean crystallite size=17 nm) was prepared in the identical fashion as the ZnO NW sample. The TPR profiles (see FIG. 11) display one major peak which points to a relatively uniform nickel particle size distribution in the sample The ZnO NP reference sample showed a reduction maximum of 345° C. and the ZnO NW sample at 358° C. The considerable difference between the reduction maxima implies that the NP sample with the lower reduction temperature shows relative ease of NiO reduction compared to the NW sample. Reducibility can serve as a measure of nickel-support interaction. The stronger the NiO interacts with the ZnO support the more difficult it is to reduce it to Ni. In addition, the stronger metal-support interaction correlates with smaller NiO and Ni particle sizes.

Figure 12:
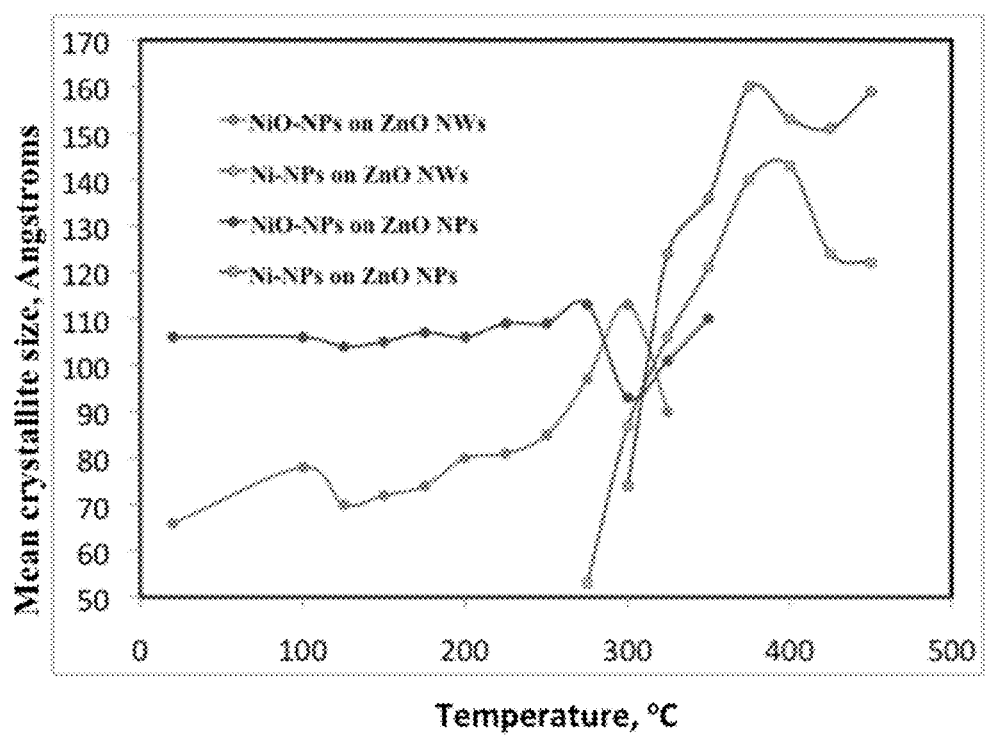
FIG. 12 is a graph showing the hot stage XRD reduction of NiO nanoparticles on ZnO supports using 5% hydrogen in nitrogen, and further showing that Ni particle size evolution is favorable with NW support.

A hot stage XRD was conducted to gain insight into the Ni particle size evolution during reduction. An XRD pattern was recorded for every 25° C. increase in temperature at the same reduction conditions as the TPR runs. When the ZnO NP sample (which was reduced in the same manner) is taken as a reference, the ZnO NWs appear to reduce the extent of Ni sintering. FIG. 12 displays the mean crystallite size evolution during reduction of both Ni decorated ZnO NPs and ZnO NWs.

Figure 13:
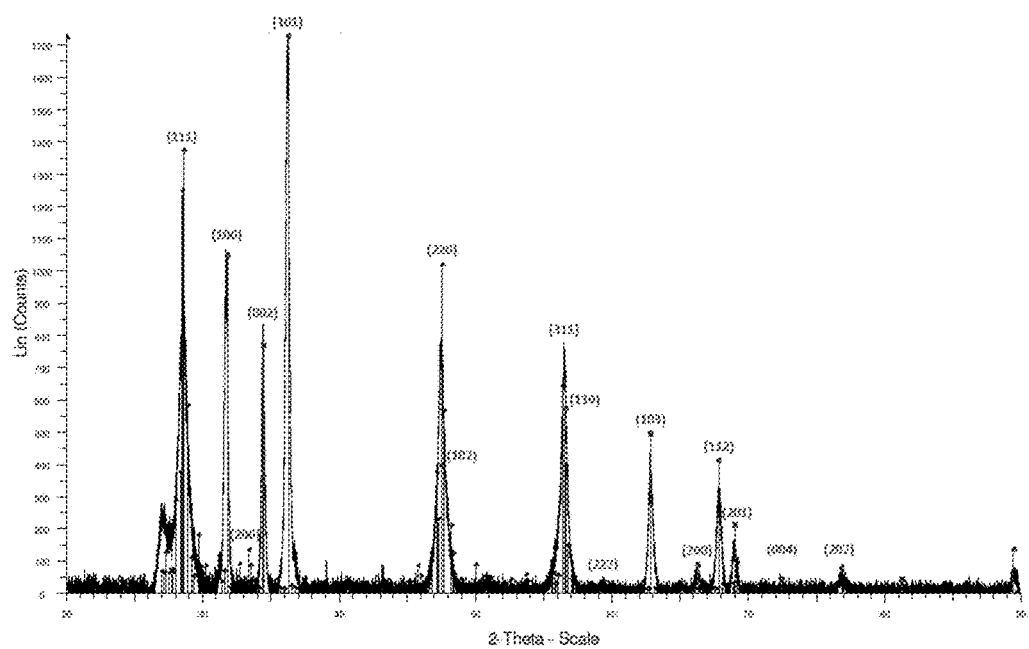
FIG. 13 is a graph showing the XRD pattern of sulfided ZnO NWs showing hexagonal ZnO and cubic ZnS and confirming sulfur pick up.
Figure 16:
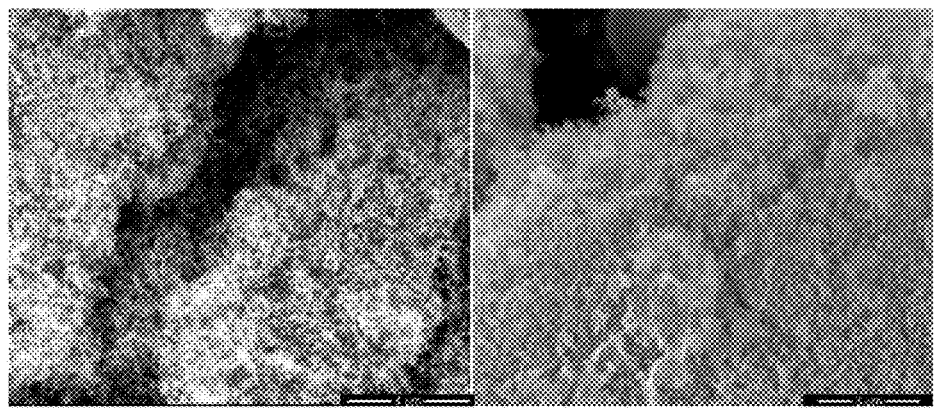
FIG. 16 includes representative SEM images of ZnO NWs after partial sulfidation and showing that NW morphology was well maintained following partial sulfidation.

Studies were also performed to investigate if the proposed catalyst carrier chemisorbs and stores hydrogen sulfide (H$_2$S). A ZnO NW powder sample of 0.2 g was turned into slurry with ethanol, spread onto a quartz plate, and placed in a vacuum reactor chamber. The reactor was slowly pumped down to a moderate 0.05 torr and heated to 200° C. A 25 sccm stream of H$_2$S was then flown over the sample for 14 hours. As shown in FIG. 13, a following XRD analysis of the powder identified a cubic zinc sulfide (ZnS) phase. Quantification revealed that 38.2% of the sample is ZnS, and the 61.8% remainder is comprised of ZnO. The SEM images of the sulfided sample appear to show "swelling" of the NWs; however, the general morphology is well maintained.

Example 3—Ni Impregnation of ZnO NWs

To impregnate ZnO NWs with a NiAc solution, a small quantity of ammonium hydroxide solution was first added to maintain the overall solution pH at 9. The powder was dried and calcined at 400° C. The SEM images of ZnO NWs impregnated with Ni using Ni Ac precursor are shown in FIG. 5. Analysis of the XRD patterns of Ni impregnated ZnO NWs sample shows both hexagonal wurzite ZnO and cubic phase of NiO. Utilizing the Scherrer equation, the average NiO crystallite size was found to be much less than 20 nm, which conforms to industry standards. To verify that the NiO particle size was less than 20 nm and to show that these particles were uniformly coated on the ZnO NWs, high resolution TEM images were obtained. The TEM images showed the NiO nano-particles were coated onto ZnO NWs with some NiO particles exhibiting diameters of less than 7 nm. To confirm that the NPs on top of the ZnO NWs were in fact NiO, a part of a single ZnO NW was mapped via EDS. The elemental maps shown in FIG. 10 revealed that the ZnO NW was decorated with NiO NPs.

The surface area of 20 $m^2/g$ obtained from BET measurements was in agreement with other publications and geometric estimations. The specific surface area could also further be improved by using lower diameter ZnO NW. For example, the ZnO NW powders possible with the above-identified reactor could have diameters below 10 nm and the estimated surface areas could exceed 70 $m^2/g$. BET surface areas were also measured for the NiAc sample with the alumina binder and the NiFt sample without binder. The results were 65 and 28 $m^2/g$ respectively.

Example 4—Desulfurization Testing

The catalyst sample was prepared with 15% Ni loaded onto 65% ZnO NW powders mixed with γ-alumnia powder and tested using a diesel feed containing 20 ppm of sulfur (thiophene—approximately 10 ppm; benzo-thiophene—approximately 3 ppm; di-benzo-thiophene—approximately 3 ppm; and other severely sterically hindered di-benzo-thiophenes) and 25% of various aromatic and poly-aromatic compounds. The treated samples at various time scales showed a promising result, i.e., ultra-deep desulfurization with ultra low sulfur over a 12 hour period. See photographs of treated diesel as a function of time in FIG. 14. However, the performance at steady state was lower than expected and that of state of the art catalysts.

The sulfur content in the product samples was analyzed with an Antek 9000 elemental sulfur analyzer. The sulfur uptake capacity of the Ni/ZnO NW/$Al_2O_3$ catalyst appeared sufficient (see FIG. 14). Sulfur in organic sulfur species needs to be catalytically converted to $H_2S$ in order for it to be stored in sulfide form in the catalyst/adsorbent. The fact that there was very little sulfur left in the product initially revealed that the Ni/ZnO NW catalytically broke down the sulfur species into $H_2S$ which was then adsorbed by the ZnO NWs.

Example 5—Deactivation of Ni/ZnO NW

Post-mortem TEM, EDS, and XRD measurements were performed in order to gain insight on the rapid deactivation that took place during desulfurization. The TEM study of the spent Ni/ZnO NW sample showed significant morphological changes. In particular, the Ni particles dispersed on ZnO NWs were much larger than in the fresh sample, with some of them reaching the size of over 100 nm (see FIG. 15A). Most of the particles were covered with a thick carbon layer like the one shown in the inset of FIG. 15A. High concentration of carbon in that sample was also confirmed by EDS measurements, both performed in TEM and SEM. In addition, nanoprobe-based EDS measurements in TEM, performed on single particles, indicated that those particles were composed of Ni and Zn (see FIG. 15B). This was in agreement with the XRD pattern obtained from this sample, which in addition to ZnO showed peaks of NiZn alloy (FIG. 15C). The NiZn phase was more than likely formed during the reduction step, which, considering the nano-sized nature of the particles involved, was probably too hot. Upon initial reflection one would associate the appearance of the NiZn phase as a strong contributor to the overall deactivation of the reactive adsorbent. However, a recent study [5], reporting on the same reactive adsorbent pair (Ni on ZnO), found a nano-sized NiZn alloy to be highly active for HDS of thiopenes. In their assessment, the NiZn alloy enhances the interaction between Ni and ZnO which could accelerate the sulfur transfer from NiS to ZnO.

The assembled catalyst system (Ni—$Al_2O_3$—ZnO NW) showed great initial activity and sulfur absorption. However, as the post-mortem characterization also revealed; extensive coking of the catalyst surface quenched all HDS activity eventually. Given the hydrogen atmosphere of 30 bars, the coking phenomenon appeared counterintuitive. However, considering the small Ni particle size with projected high activity of the catalyst sample and the high fraction of feed aromatics and poly-aromatics the catalyst likely underwent rapid coke buildup as a result of strong initial adsorption of the polyaromatic fraction. The highly active Ni phase, starved of adsorb-hydrogen, indiscriminately and incompletely hydrogenated adsorbed feed species, especially the aromatic and polyaromatic share. Without wishing to be bound by any particular theory, it was believed that this probably resulted in relatively stable condensed aromatic clusters and possibly other graphite-like structures eventually physically blocking all active Ni sites in a "fouling" manner. Nevertheless, simple adjustments to the initial experimental setup (i.e. reduced calcination and reduction temperature increased hydrogen pressure, polyaromatics free feeds, lower Ni content, promoters, higher surface area, etc.) were believed to be able to help to fine tune the intricacies of the proposed ultra-deep HDS catalyst system.

Discussion of Examples 1-5

Gas phase oxidation of micron scale zinc powders using oxygen atmospheric plasma flame using 1.5 kW microwave power allowed for production of hundred gram batches of ZnO NW powders with diameters ranging from 5-50 nm and lengths varying from 1-15 microns. The resulting powders collected from the exhaust flume contained over 90% of nanowires whose lengths exceeded several microns suggesting continuous growth during entrainment. The Ni impregnation of nanowires resulted in much smaller NiO particles compared to ones on corresponding spherical ZnO NPs. In particular, the decomposition of NiFt as precursor allowed for creation of cube-like morphology with dimensions less than 5 nm. The catalysts prepared using Ni NPs supported on ZnO NWs allowed high initial activity toward deep desulfurization but lost significant activity within 16 hours. Analysis of the spent catalyst revealed a NiZn alloy phase which probably evolved during the reduction step and that an excessive amount of coking occurred which eventually shut down activity of the catalyst completely. The use of a diesel oil with a significant fraction of aromatics (about 25%) is attributed to the excessive coking observed.

Examples 6-8 are presented to demonstrate the effects of varying the nickel and alumina loading levels.

Example 6

Figure 17A:
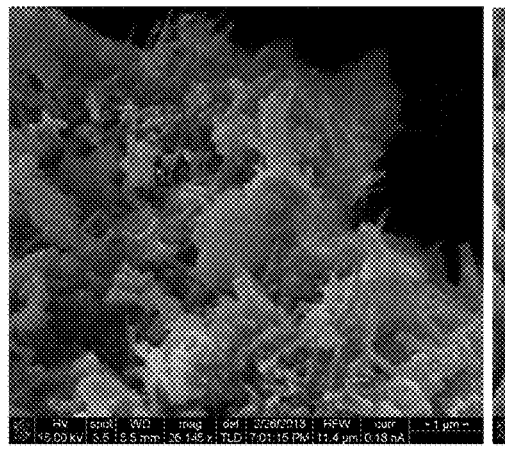
FIGS. 17A and B are SEM micrographs of Ni—ZnO—$Al_2O_3$ nanowire catalysts generated through Example 6.
Figure 17B:
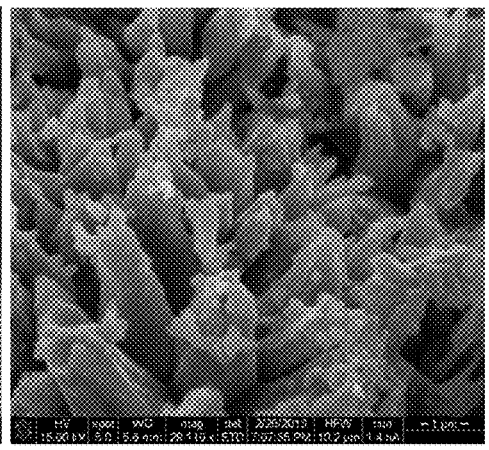

ZnO nanowires were purified to remove ZnO/Zn micro and nanoparticles. A mixture of deionized (DI) water and nanowires (1 L) was made and sonicated for 10 min and then left to settle for 10 min. The unwanted material quickly settles down in the beaker. The ZnO NW suspension were decanted into another beaker. Then $NH_4OH$ was added to the suspension to make pH 9.2 (iso-electric point of ZnO NW). Nanowires settle down in a few minutes and then the water was decanted to obtain "pure" ZnO NW. These purified nanowires were then used to synthesize catalyst. A slurry of 200 mL was made by adding DI water to 12.2 g ZnO NW and 6.07 g $\gamma$-$Al_2O_3$. Aqueous solution of 10.53 g of nickel acetate ($NiCOOH.2H_2O$) was made by adding 75 mL of DI water to it. The mixture was heated and stirred at 90° C. for 10 min to fully dissolve nickel acetate. The nickel acetate solution was added drop-by-drop to the slurry and the mixture was stirred. The pH was maintained around 9 by adding aqueous solution of $NH_4OH$. Then, the mixture was dried at 80° C. for 15 hours in a furnace and stirred once during drying. Thereafter, the mixture was dried at 150° C. for 4.5 hours and stirred once to obtain a thick paste for extrusion. Thereafter the paste was extruded and dried at 150° C. for 1 hours. Finally, it was calcined at 390 C for 2.5 h. The extrudates thus obtained were labeled as CATALYST A. The composition, BET surface area, and crystallite size are given in Table 1. FIGS. 17A and 17B show SEM images of CATALYST A.

Figure 18:
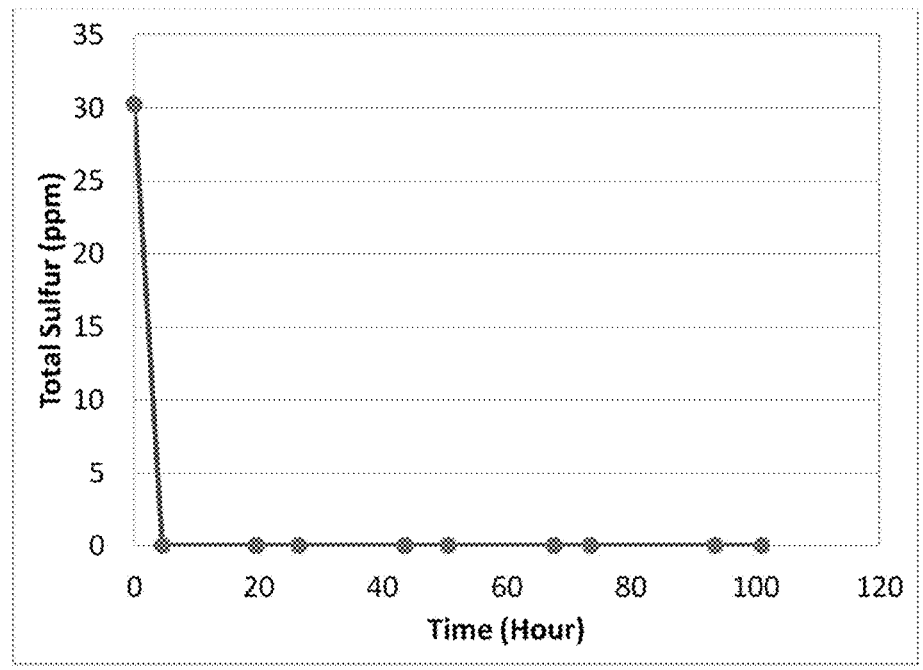
FIG. 18 is the desulfurization curve using the catalyst of Example 6.

Hydro-Desulfurization Test:

The catalyst was reduced at 430° C. for 3 h with a $H_2$ flow rate of 0.15 L/min at atmospheric pressure. After reduction the reactor was cooled down to room temperature. The hydro-desulfurization reaction was carried out at 30 bar and 290° C. with 0.15 L/min $H_2$ flow. The diesel feed rate was 0.36 mL/min. The liquid hourly space velocity (LHSV) was 2.2 $h^{-1}$. The diesel was obtained from a refinery in Kentucky, USA. The total sulfur content in the feed diesel was 9 ppm. Approximately 21 ppm of sulfur (thiophene) was added to the diesel to obtain 30.3 ppm S. This was then used as the feed for the hydro-desulfurization test. The treated diesel samples were collected every few hours during the test. The sulfur content in diesel was less than 1 ppm at any time and up to 103 hours. The reaction was stopped and catalyst was taken out after 103 hours when it was still active. The desulfurization activity is shown graphically in FIG. 18.

Example 7

A slurry of 300 mL was made by adding DI water to 13 g ZnO NW and 4.49 g $\gamma$-$Al_2O_3$. Nickel acetate (19.71 g) was added slowly and pH was maintained approximately 9 by adding an aqueous solution of $NH_4OH$. Total volume of the mixture was 400 mL. The mixture was dried at 80° C. for 17 h. Then it was stirred and heated at 150° C. for 5 h. The mixture was transferred to adish and dried at 150° C. for 1 h. Then it was extruded and the extrudates were dried at 120° C. for 1 h. The extrudates thus obtained were labeled as CATALYST B. The composition, BET surface area, and crystallite size are given in Table 1. FIGS. 19A and 19B show SEM images of CATALYST B.

Hydro-Desulfurization Test:

First, the catalyst was reduced at 430° C. for 3 hours with a $H_2$ flow rate of 0.15 L/min at atmospheric pressure. After reduction the reactor was cooled down to room temperature. The hydro-desulfurization reaction was carried out at 30 bar and 290° C. with 0.15 L/min $H_2$ flow. The diesel feed rate was 0.36 mL/min. The liquid hourly space velocity (LHSV) was 2.2 $h^{-1}$. The diesel was obtained from a refinery in Kentucky, USA. The total sulfur content in the feed diesel was 9 ppm. Approximately 21 ppm of sulfur (thiophene) was added to the diesel to obtain 30.5 ppm S. This was then used as the feed for the hydro-desulfurization test. The treated diesel samples were collected every few hours during the test. The sulfur content in diesel was less than 1 ppm at any time and up to 100 hours. The reaction was stopped and catalyst was taken out after 103 hours when it was still active. The desulfurization activity is shown graphically in FIG. 20.

TABLE 1

Catalyst composition, calcinations condition, crystallite size, and BET surface area

| Catalyst | Ni (wt %) | ZnO (wt %) | $\gamma$-$Al_2O_3$ (wt %) | BET Surface Area ($m^2/g$) | Ni Crystallite Size (nm) |
|---|---|---|---|---|---|
| CATALYST A | 12 | 58.7 | 29.3 | 18.1 | |
| CATALYST B | 21 | 58.7 | 20.3 | 19.1 | |
| CATALYST C | 30 | 58.7 | 11.3 | 9.3 | |

Example 8

A slurry of 500 mL was made by adding DI water to 15 g ZnO NW and 2.88 g $\gamma$-$Al_2O_3$. Nickel acetate ($NiCOOH.2H_2O$) (32.5 g) was added slowly and pH was maintained approximately 9 by adding an aqueous solution of $NH_4OH$. The mixture was dried at 120° C. for 17 h. Then it was stirred and heated at 150° C. for 5 h. The mixture was transferred to a an evaporating dish and dried at 100° C. for 1.5 h. Then it was extruded and the extrudates were dried at 120° C. for 1 h. Finally, it was calcined at 390 C for 2 h. The extrudates thus obtained were labeled as CATALYST C. The composition, BET surface area, and crystallite size are given in Table 1. FIGS. 21A and 21B show SEM images of CATALYST C.

Hydro-desulfurization Test: The catalyst was reduced at 430° C. for 5 hours with a $H_2$ flow rate of 0.15 L/min at atmospheric pressure. After reduction the reactor was cooled down to room temperature. The hydro-desulfurization reaction was carried out at 30 bar and 290° C. with 0.15 L/min $H_2$ flow. The diesel feed rate was 0.25 mL/min. The liquid hourly space velocity (LHSV) was 1.1 $h^{-1}$. The diesel was commercial fuel (with additives) obtained from a gas station in Louisville, Ky., USA. The total sulfur content in the feed diesel was 15 ppm. Approximately 20 ppm of sulfur (thiophene) was added to the diesel to obtain 35 ppm sulfur. This was then used as the feed for the hydro-desulfurization test. The treated diesel samples were collected every few hours during the test. The sulfur content in diesel was less than 1 ppm at any time and up to 112 hours as FIG. 6. The reaction was catalyst was still active after 112 hours. The desulfurization activity is shown graphically in FIG. 22.

Figure 23:
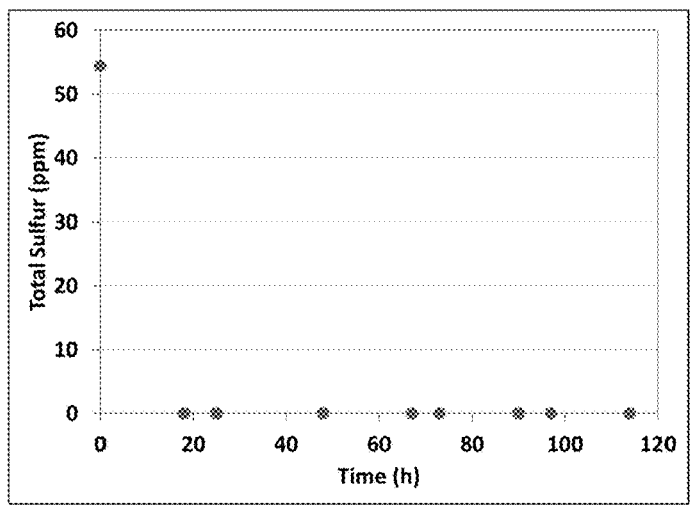
FIG. 23 is the desulfurization curve of kerosene.

Desulfurization of Kerosene:

Sulfur removal is a necessity for various fuels: crude, diesel, gasoline, kerosene, naptha and ethanol. In order to understand the behavior of our catalyst toward fuels other than diesel, we performed a test using sulfur spiked kerosene fuel. Kerosene represents long chain hydrocarbons compared to diesel that contains mostly oxygenated hydrocarbon complexes. In this test, the catalyst (15% Ni, 58.7% ZnO, 26.3% γ-$Al_2O_3$) was first reduced at 430° C. for 1.5 h with a $H_2$ flow rate of 0.15 L/min at atmospheric pressure. The hydro-desulfurization reaction was carried out at 30 bar and 290° C. with 0.15 L/min $H_2$ flow. The diesel feed rate was 0.32 mL/min. The liquid hourly space velocity (LHSV) was 2.2 $h^{-1}$. The kerosene grade was K-1 that is used for household purposes. The total sulfur content in the feed was 21.7 ppm. Approximately 33 ppm of sulfur (thiophene) was added to kerosene to increase total sulfur. This kerosene was then used as the feed for the hydro-desulfurization test. The treated kerosene samples were collected every few hours during the test. The sulfur content was less than 1 ppm for over 100 hrs as evident from FIG. 23. The results shown in FIG. 23 indicate again the effectiveness of our catalyst in ultra-deep desulfurization of various fuels.

Example 9 provides a method for loading active metal particles on to nanowire supports.

Example 9

Figure 24:
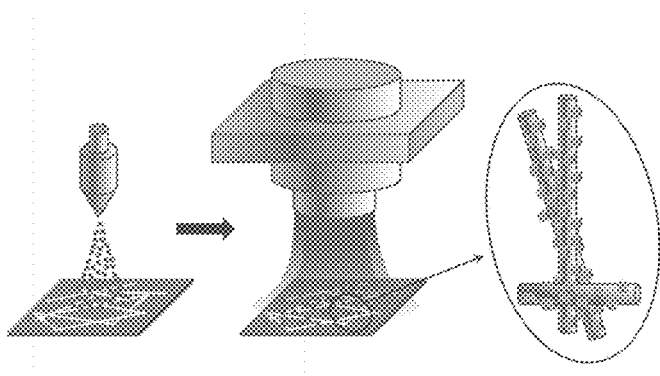
FIG. 24 is a schematic depicting a simple scheme of decorating NiO nanoclusters using spray followed by plasma or even flame exposure.

Spray process with plasma exposure for Ni and Ni+Mo loading on ZnO nanowire powders: A schematic for the method is shown in FIG. 24, and involves spraying metal precursor on to ZnO NW powders followed by plasma exposure for a short period to decompose the precursor in to respective metal oxide nanocluster on the ZnO nanowire.

Figure 25:
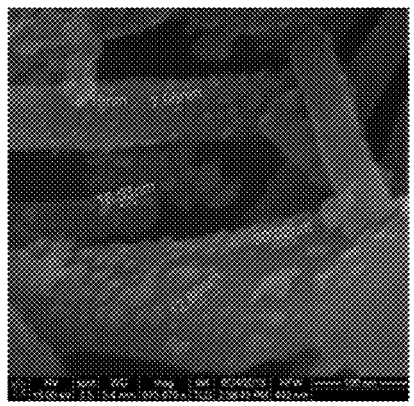
FIG. 25 is an SEM image showing NiO nanocluster decoration on ZnO NWs.
Figure 26:
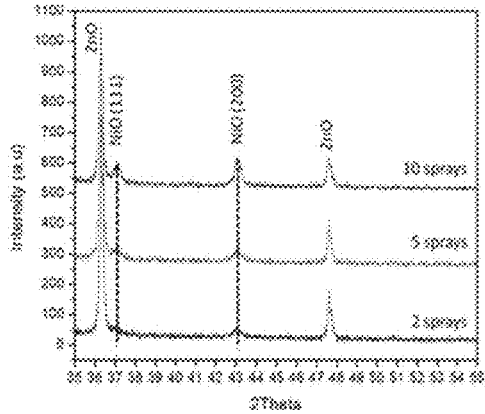
FIG. 26 is a graphical depiction of XRD data shows the presence of NiO.

The demonstration experiments are performed using home-made bottle spray of 10.5 wt % nickel acetate tetrahydrate in DI water for several times (2, 5 or 10 times). The volume used per each spray was around 0.78 mL. These samples were dried with air before re-spraying. Then, they were exposed to plasma using a microwave power of 500 W for about 30 seconds. The entire process takes less than 1 minute. SEM images in FIG. 25 show decoration of ZnO NWs with nanoclusters. XRD confirmed the presence of NiO nanoclusters. As shown in the FIG. 26 SEM image, the nanoclusters maintain good interface with ZnO nanowire surface which should help in improving the catalyst performance. The resulting average sizes ranged from sub-10 nm to 25 nm in the experiments conducted to-date.

It will be understood that various details of the presently disclosed subject matter can be changed without departing from the scope of the subject matter disclosed herein. Furthermore, the foregoing description is for the purpose of illustration only, and not for the purpose of limitation.

For further explanation of the features, benefits and advantages of the presently-disclosed subject matter, attached hereto is an Appendix, which is incorporated herein by this reference, and includes various documents. All references cited in the Appendix are incorporated herein by this reference.

Throughout this document, various references are mentioned. All such references are incorporated herein by reference, including the references set forth in the following list:

REFERENCES

1. S. A. Ali, S. Ahmed, Fuel Processing Technology 98 (2012) 39-44.
2. Q. Gao, T. Ofosu, Catal. Today 164 (2011) 538-543.
3. T. Fujikawa, H. Kimura, Catal. Today 111 (2006) 188-193.
4. H. Farag, I. Mochida, J. Colloid and Interface Sci. 372 (2012) 121-129.
5. Y. Zhang, Y. Yang, Appl. Catal. B, 119 (2012) 13-19.
6. E. Ito, J. R. V. Veen, Catal. Today 116 (2006) 446-460.
7. C. Song, Catal. Today 86 (2003) 211-263.
8. A. Stanislaus, A. Marafi, M. Rana, Catal. Today 153 (2010) 1-68.
9. P. Biswas, D. Kunzru, International Journal of Hydrogen Energy 32 (2007) 969-980.
10. A. Chica, S. Sayas. Catal. Today 146 (2009) 37-43.
11. V. Fierro, O. Akdim, H. Provendier, C. Mirodatos, Journal of Power Sources 145 (2005) 659-666.
12. A. Haryanto, S. Fernando, N. Murali, S. Adhikari, Energy & Fuels 19 (2005) 2098-2106.
13. J. Llorca, N. Horns, J. Sales, P. R. de la Piscina. Journal of Catalysis 209 (2002), 306-317.
14. H. Muroyama, R. Nakase, T. Matsui, K. Eguchi, Int. J. of Hydrogen Energy 35 (2010) 575-1581.
15. K. Tawara, J. Imai, H. Iwanami, Sekiyu Gakkaishi-J. Japan Petroleum Institute 43 (2000) 105-113.
16. I. Bezverkhyy, A. Ryzhikov, G. Gadacz, J. P. Bellat. Catal. Today 130 (2008), 199-205.
17. J. Costa-Sena, R. Guil-Lopez, A. Chica, Int. J. of Hydrogen Energy 35 (2010) 6709-6716.
18. J. Fan, G. Wang, Y. Sun, C. Xu, H. Zhou, G. Zhou, J. Gao, Ind. Eng. Chem. Res. 49 (2010) 8450-8460.
19. L. C. Huang, Z. Qin, G. Wang, M. Du, H. Ge, X. Li, Z. Wu, J. A. Wang, Ind. Eng. Chem. Res. 49 (2010) 4670-4675.
20. Y. J. Lee, N.-K. Park, G. B. Han, S. O. Ryu, T. J. Lee, C. H. Chang, Curr. Appl. Phys. 8 (2008) 746-751.
21. A. Ryzhikov, I. Bezverkhyy, J. Bellat, Appl. Catal. B 35 (2008) 6709-6716.
22. K. Tawara, T. Nishimura, H. Iwanami, T. Nishimoto, T. Hasuike, Ind. Eng. Chem. Res. 40 (2001) 2367-2370.
23. J. Zhang, Y. Liu, S. Tian, Y. Chai, C. Liu, J. Nat. Gas Chem. 19 (2010), 327-332.
24. L. Huang, G. Wang, Z. Qin, M. Dong, M. Du, H. Ge, X. Li, Y. Zhao, J. Zhang, T. Hu, J. Wang, Appl. Catal. B 106 (2011) 26-38.
25. K. Tawara, T. Nishimura, I. Iwanami, Sekiyu Gakkaishi-J. Japan Petroleum Institute 43 (2000), 114-120.
26. J. F. Da Costa-Sena, R. Guil-Lopez, A. Chica, Int. J. Hydrogen Energy 35 (2010), 6709-6716.
27. J. Zhang, Y. Liu, S. Tian, Y. Chai, C. Liu, J. Nat. Gas Chem. 19 (2010) 327-332.
28. Z. J. Cheng, J. Nan, H. B. Yu, Y. Q. Liu, S. Geng, G. H. Liu, C. G. Liu, Adv. Mater. Res. 239 (2011) 754-758.
29. V. Kumar, J. H. Kim, C. Pendyala, B. Chernomordik, M. K. Sunkara, J. Phys. Chem. C 112 (2008) 17750-17754.
30. R. S. Wagner, W. C. Ellis. Appl. Phys. Lett. 89 (1964) 1753975-1753977.
31. A. M. Morales, C. M. Lieber, Science 279 (1998) 208-211.
32. M. Meyyappan, M. K. Sunkara, Inorganic Nanowires: Applications, Properties and Characterization 2010, Boca Raton, Fla.: CRC presss.
33. M. K. Sunkara, S. Sharma, U.S. Pat. No. 7,252,811, Aug. 7, 2007.
34. S. Sharma, M. K. Sunkara, U.S. Pat. No. 6,806,228, Sep. 16, 2003.
35. M. K. Sunkara, S. Sharma, U.S. Pat. No. 7,182,818, Feb. 27, 2007.
36. S. Sharma, M. K. Sunkara, J. Am. Chem. Soc. 124 (2002) 12288-12293.

37. M. K. Sunkara, S. Vaddiraju, M. Mozetic, U. Cvelbar, U.S. Pat. No. 7,591,897, Sep. 22, 2009.
38. A. Gutsch, M. Kramer, G. Michael, H. Muhlenweg, M. Pridohl, G. Zimmerman, Kona 20 (2002) 24-37.
39. B. Liu, H. C. Zeng, J. Am. Chem. Soc. 12 (2003), 4430-4431.
40. M. P. Zach, K. H. Ng, R. M. Penner, Science 290 (2000) 2120-2123.
41. Costa-Serra, J., Guil-Lopez, R., and Chica, A. 2010. International Journal of Hydrogen Energy 35:6709-6716.
42. Fan, J., et al. 2010. Ind. Eng. Chem. Res. 49:8450-8460
43. Huang, L., et al. 2011. Applied Catalysis B: Environmental 106:26-38.
44. Lee, Y., et al. 2008. Current Applied Physics 8:746-751.
45. Liu, Hongyang, Allard, Lawrence, and Liu, Jingyue. 2011. Saint Louis: Center for Nanoscience.
46. Ryzhikov, A., Bezverkhyy, I., and Bellat, J. 2008. Applied Catalysis B: Environmental 84:766-772.
47. Tawara, K., et al. 2001. Ind Eng. Chem. Res. 40:2367-2370.

Zhang, J., et al. 2010. Journal of Natural Gas Chemistry 19:327-332.

What is claimed is:

1. A method of synthesizing a desulfurization catalyst composition comprising:
    activating a plasma discharge reactor with a mixture of nitrogen, oxygen, and hydrogen gases to create a plasma discharge;
    exposing a zinc metal powder comprising zinc metal particles, wherein each zinc metal particle has a diameter of about 0.5 μm to about 5 μm, to the plasma discharge for a predetermined time period such that zinc oxide nanowires having a length from about 100 nm to about 10 μm and having a diameter from about 10 nm to about 150 nm are formed;
    removing the zinc oxide nanowires from the plasma discharge;
    then combining γ-$Al_2O_3$ with the nanowires before coating the nanowires with catalytically-active metal particles;
    then coating or impregnating the zinc oxide nanowires with catalytically-active metal particles selected from the group consisting of cobalt particles, molybdenum particles, copper particles, tungsten particles, platinum particles and nickel particles, wherein the catalytically-active metal particles each have a diameter of from about 2 nm to about 20 nm as determined by X-ray diffraction patterns and utilizing the Scherrer equation, to thereby attach one or more catalytically-active metal particles to a surface of the zinc oxide nanowires to produce an active metal-treated nanowire powder or paste; and,
extruding or spheronizing the metal-treated nanowire powder or paste to produce a desulfurization catalyst.

2. The method of claim 1 wherein the plasma discharge has a power of about 200 W to about 5000 W.

3. The method of claim 1 wherein a concentration of oxygen in the gas is about 2 percent to about 20 percent.

4. The method of claim 1 wherein the hydrogen gas is included in the mixture at a flow rate of about 1 to about 500 sccm.

5. The method of claim 1 wherein the exposing the zinc metal powder to the plasma discharge comprises feeding the zinc metal powder into the plasma discharge reactor at a rate of about 1 g of zinc metal powder per minute.

6. The method of claim 1 wherein a spray of catalytic metal containing precursor in a solvent is applied to said zinc oxide nanowire powder and then the sprayed powder is exposed to atmospheric plasma for a period of time ranging from 5-15 seconds.

7. The method of claim 1 further comprising treating the metal-treated nanowires by hydrogen reduction using a temperature of from about 340° C. to about 430° C. and a time period of from about 0.5 hours to about 3 hours.

8. The method of claim 1 wherein the desulfurization catalyst comprises from about 6 wt % to about 30 wt % catalytically-active metal particles.

9. The method of claim 1 wherein the desulfurization catalyst comprises from about 6 wt % to about 30 wt % catalytically-active metal particles and from about 5 wt % to about 30 wt % γ-$Al_2O_3$.

10. The method of claim 9 wherein the desulfurization catalyst comprises from about 6 wt % to about 30 wt % nickel metal particles and from about 5 wt % to about 30 wt % γ-$Al_2O_3$ and further comprises from about 3 wt % to about 10 wt % catalytically-active metal selected from cobalt, molybdenum, tungsten, copper, platinum and combinations thereof.

11. The method of claim 1, further comprising depositing molybdenum oxide particles on the metal-treated nanowires, wherein said molybdenum oxide particles comprise up to about 8 wt % of the coated zinc oxide nanowires.

12. The method of claim 1, wherein the zinc oxide nanowires have a surface area of at least about 5 $m^2$ per gram of nanowires.

13. A method of synthesizing a desulfurization catalyst comprising:
    a. producing zinc oxide nanowires having a length from about 100 nm to about 10 μm and having a diameter from about 10 nm to about 150 nm;
    b. then combining γ-$Al_2O_3$ with the zinc oxide nanowires before coating the nanowires with catalytically-active metal particles; and,
    c. then coating the zinc oxide nanowires with catalytically-active metal particles selected from the group consisting of cobalt particles, molybdenum particles, copper particles, tungsten particles, platinum particles and nickel particles, wherein the catalytically-active metal particles each have a diameter of from about 2 nm to about 20 nm, to produce a desulfurization catalyst.

14. The method of claim 13 wherein the zinc oxide nanowires are coated with nickel oxide particles by allowing the nanowires to react in an aqueous solution comprising nickel acetate, wherein the solution pH is maintained at 9, followed by treating with heat.

15. The method of claim 13 wherein the desulfurization catalyst comprises from about 6 wt % to about 30 wt % catalytically-active metal particles and from about 5 wt % to about 30 wt % γ-$Al_2O_3$, and up to about 8 wt % molybdenum oxide particles deposited on the metal-treated nanowires.

* * * * *